March 27, 1962 D. R. ANDREWS ET AL 3,027,109

MAGNETIC RECORDING AND REPRODUCING EQUIPMENT

Filed Sept. 29, 1958 10 Sheets-Sheet 1

INVENTORS
DALLAS R. ANDREWS &
ELWOOD S. MARIS, SR.
BY
Morris A. Rabkin
ATTORNEY

March 27, 1962 D. R. ANDREWS ET AL 3,027,109

MAGNETIC RECORDING AND REPRODUCING EQUIPMENT

Filed Sept. 29, 1958 10 Sheets-Sheet 2

INVENTORS
DALLAS R. ANDREWS &
BY ELWOOD S. MARIS, SR.
Morris Laktin
ATTORNEY

INVENTORS
DALLAS R. ANDREWS &
ELWOOD S. MARIS, SR.
BY
Morris A. Lebkin
ATTORNEY

March 27, 1962 D. R. ANDREWS ET AL 3,027,109

MAGNETIC RECORDING AND REPRODUCING EQUIPMENT

Filed Sept. 29, 1958 10 Sheets-Sheet 4

INVENTORS
DALLAS R. ANDREWS &
ELWOOD S. MARIS, SR.
BY
Morris L. Rabkin
ATTORNEY

March 27, 1962 D. R. ANDREWS ET AL 3,027,109

MAGNETIC RECORDING AND REPRODUCING EQUIPMENT

Filed Sept. 29, 1958 10 Sheets-Sheet 5

INVENTORS
DALLAS R. ANDREWS &
ELWOOD S. MARIS, SR.
BY Morris A. Rabkin
ATTORNEY

MAGNETIC RECORDING AND REPRODUCING EQUIPMENT

Filed Sept. 29, 1958 10 Sheets-Sheet 6

INVENTORS
DALLAS R. ANDREWS &
ELWOOD S. MARIS, SR.
BY Morris A. Rabkin
ATTORNEY

March 27, 1962 D. R. ANDREWS ET AL 3,027,109

MAGNETIC RECORDING AND REPRODUCING EQUIPMENT

Filed Sept. 29, 1958 10 Sheets-Sheet 7

INVENTORS
DALLAS R. ANDREWS &
ELWOOD S. MARIS, SR.
BY
Morris A. Kahn[?]
ATTORNEY INVENTORS
DALLAS R. ANDREWS &
ELWOOD S. MARIS, SR.
BY
Morris L. Rabkin
ATTORNEY INVENTORS
DALLAS R. ANDREWS &
ELWOOD S. MARIS, SR.
BY Morris A. Rabkin
ATTORNEY INVENTORS
DALLAS R. ANDREWS &
ELWOOD S. MARIS, SR.
BY Morris A. Rabkin
ATTORNEY United States Patent Office 3,027,109
Patented Mar. 27, 1962

3,027,109
MAGNETIC RECORDING AND REPRODUCING EQUIPMENT

Dallas R. Andrews, Merchantville, N.J., and Elwood S. Maris, Sr., Haverford, Pa., assignors to Radio Corporation of America, a corporation of Delaware
Filed Sept. 29, 1958, Ser. No. 766,167
38 Claims. (Cl. 242—55.12)

The present invention relates to magnetic recording and reproducing equipment, and more particularly to apparatus for handling an elongated, flexible magnetic record carried in a storage container or cartridge.

While the invention is especially applicable to magnetic recording and reproducing equipment, it is also useful in other apparatus for reeling and transporting flexible web mediums.

Magnetic recording and reproducing techniques are adapted to provide the highest quality sound recordings available at the present time. The difficulty of operating magnetic tape recorders has been largely responsible for the limited use of magnetic recordings, as compared to disc records. For example, magnetic records are usually tapes which are wound on individual reels. The tapes must be carefully threaded through the pickup heads, driving elements, and tape guides of the recording and reproducing equipment. It has been difficult to design low cost, quality magnetic recording and reproducing equipment for simplicity and convenience of operation. Thus, reasonably low cost magnetic recording equipment having facilities for simple and convenient operation has not been made generally available.

The present invention, when incorporated in magnetic tape recording and reproducing equipment, provides a tape handling and transport mechanism which is automatically operative to permit sound recording or reproduction continuously for as long as several hours. The tape transport mechanism has further features of being adapted for cooperation with magnetic tape records carried in cartridges.

Briefly described, a tape transport mechanism provided in accordance with the present invention includes a plurality of elements for guiding, driving, and scanning the magnetic tape record to record signals thereon or to reproduce signals therefrom. These elements are disposed along a path of travel for the tape. The tape is carried within a cartridge which includes further elements which define a complementary path for tape travel therein. The walls of the cartridge are provided with openings and recesses configured and disposed to cooperate with the tape transport mechanism by receiving the various elements thereon. Thus, there is provided a novel combination of an improved cartridge and an improved tape transport mechanism which facilitates and simplifies magnetic recording and reproduction.

In order to provide automatic operation, a tape transport mechanism incorporating improvements provided by the present invention includes a control member which is actuable into operative position to engage the tape driving elements and to bring them into driving relationship with the tape. A latching member is included in the transport mechanism having means near one end thereof for contacting the tape to be responsive to the tension therein. Other means are disposed near the opposite end of the latching member which latch with the control member to maintain the control member in operating position. The tension responsive tape contacting means is operative to release the latching member from latching engagement with the control member. Since the tension in the tape increases as the tape comes near the end of its travel in one direction, the control member is automatically released at the end of tape travel. When it is desired to provide for tape travel in the opposite direction, further control means may be provided to actuate the control member or another similar control member.

Thus, it is the principal object of the present invention to provide improved recording and reproducing apparatus which will provide high quality reproduction with minimum attention on the part of the operator.

More particularly, it is an object of the present invention to provide, in sound recording and reproducing apparatus of the type which makes use of elongated web mediums, such as magnetic tape records, improved equipment for handling such mediums.

It is another object of the present invention to provide improved apparatus for handling elongated web mediums.

It is another object of the invention to provide an improved apparatus for magnetic recording and reproduction which is simpler and more convenient to operate than such apparatus as has been heretofore available.

It is still another object of the present invention to provide apparatus for handling reelable recording mediums which operates automatically to perform various reeling operations and which may be made generally available at lower cost than similar apparatus which has been heretofore available.

It is a further object of the present invention to provide improved apparatus for handling elongated flexible mediums disposed in cartridges.

It is a still further object of the present invention to provide an automatic tape recorder and reproducer adapted to receive tape cartridges.

It is a still further object of the present invention to provide an improved tape transport mechanism which is cooperative in combination with an improved tape cartridge, which combination results in improved magnetic recording and/or reproducing equipment having features of operation and construction not heretofore available in such equipment.

It is a still further object of the present invention to provide magnetic recording and reproduction apparatus which is readily adapted for either monaural or stereophonic sound recording and reproduction.

The invention itself, both as to its organization and method of operation, as well as the foregoing and other objects and advantages thereof, will become more readily apparent from a reading of the following description in connection with accompanying drawings in which.

Figure 1:
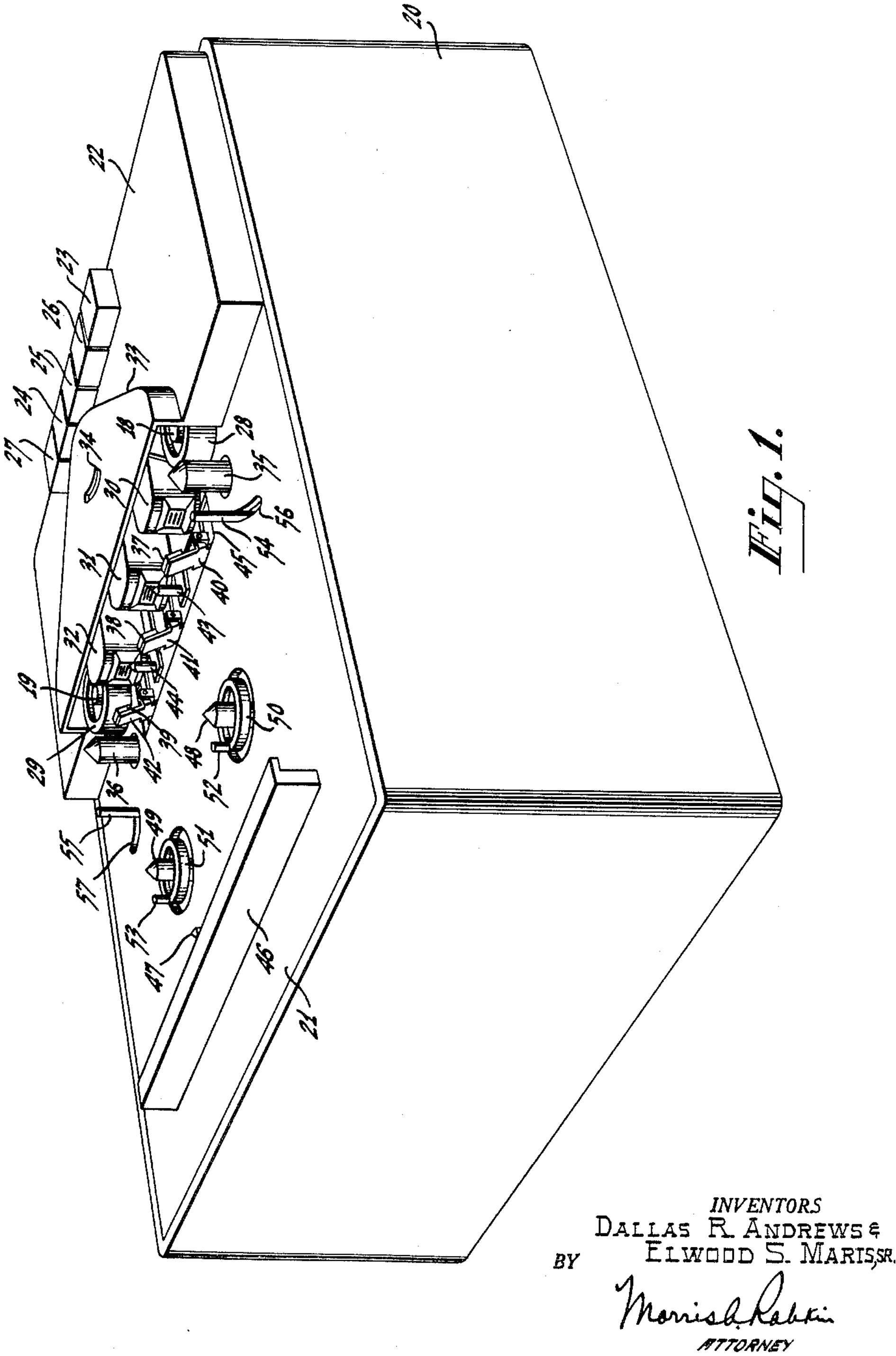
FIGURE 1 is a perspective view of a magnetic recording and reproducing apparatus constructed to incorporate features of the present invention.

In FIGURE 1, a machine is shown which is operative for magnetic tape recording and reproducing of both monaural and stereophonic sound records. This machine is sometimes designated by those skilled in the art as a "tape transport mechanism." The manner in which the electronic apparatus associated with the machine shown in FIGURE 1 is connected thereto determines whether the machine will be operative as a recorder or as a reproducer. It will be appreciated that the machine shown in FIGURE 1 may be provided with electronic apparatus which may be connected to provide the functions of either magnetic recording or magnetic reproduction. If desired, the machine may be produced incorporating simplified electronic apparatus suitable only for magnetic reproduction. However, in most cases, the machine will include electronic apparatus operable for both recording and reproduction. In such cases, the equipment is commonly referred to by those skilled in the art as a "magnetic recorder." Since the machine is adapted to handle and transport magnetic tape records during either recording or reproduction, the features incorporated therein will be found useful in magnetic reproducing, as well as recording, equipment.

Figure 2:
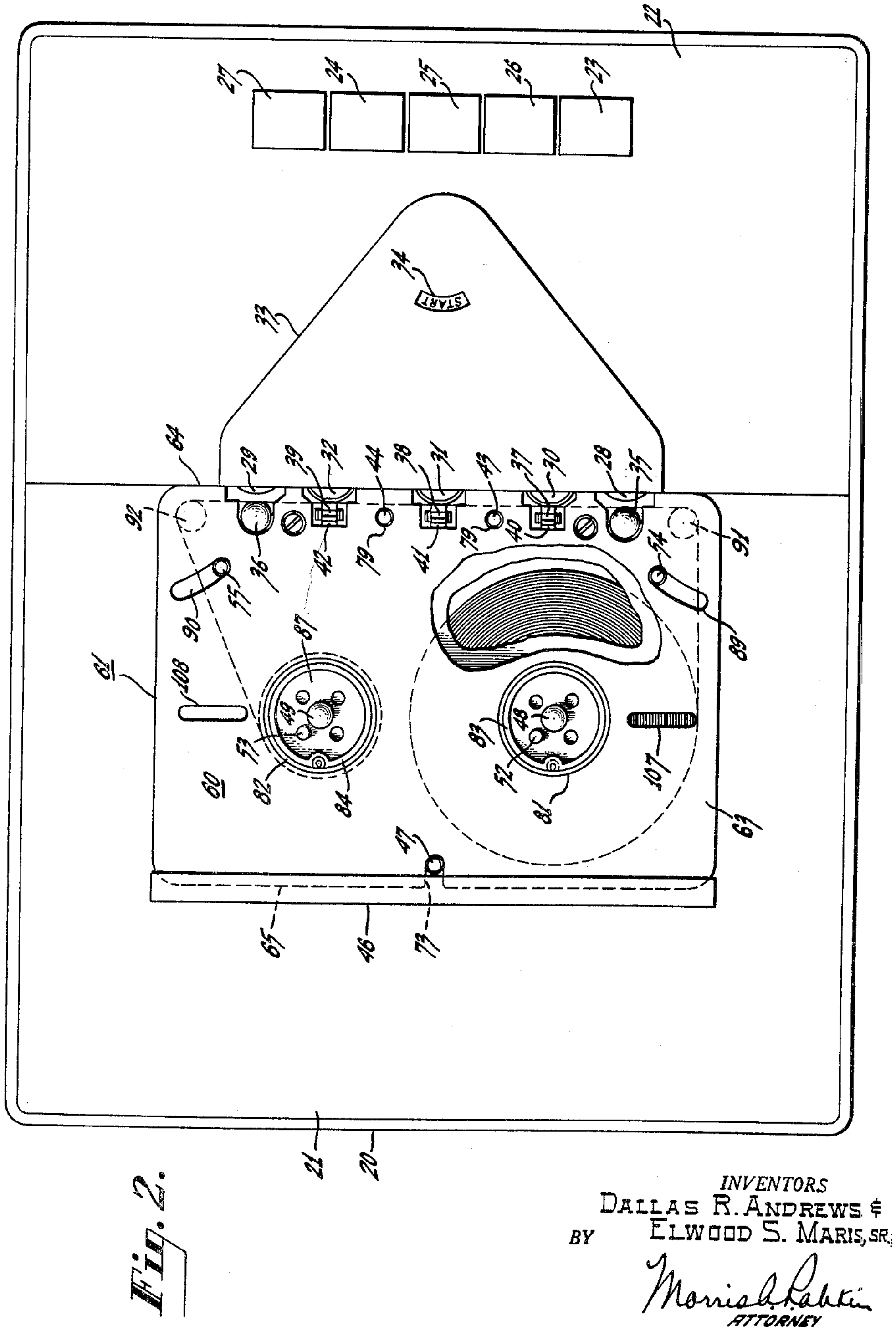
FIGURE 2 is a top plan view of the magnetic recording and reproducing apparatus shown in FIGURE 1 with tape cartridge disposed for cooperation therewith.

The machine shown in FIGURE 1 includes a housing 20. A plate 21 provides a deck on which the tape cartridges may be placed, as shown in FIGURE 2. The plate 21 is referred to hereinafter as a tape deck 21. An escutcheon 22 is disposed on the deck. Openings are provided in the escutcheon. Push buttons 23, 24, 25, 26, and 27 extend through the openings in the escutcheon. These push buttons control the operation of the machine. Push button 23 is the "start" button. It is depressed to initiate operation of the recorder. Push button 24 is depressed when fast reeling is desired in the forward direction from left to right as viewed in FIGURE 2 when looking from the front of the deck 21 (near the push buttons). This push button 24 will be referred to hereinafter as the "fast forward" button. When the machine operation is to be stopped, the button 25 is depressed. This button is, therefore, referred to as the "stop" button. Push button 26 is used for the reverse reeling control to achieve fast reeling from right to left as viewed in FIGURE 2. It will be referred to hereinafter as the "reverse" button. After a period of operation, it is sometimes desired to stop the recorder for a short time, and thereafter resume operation. The push button 27 may be depressed when resumption of operation is desired. The button 27 will, therefore, be referred to as "resume" button. Thus, the stop button 25 and the resume button 27 may be depressed when it is desired to edit the material being recorded on the machine.

A pair of pressure rollers 28 and 29 of yieldable material are disposed on the tape deck 21. These rollers 28 and 29 are carried on shafts 18 and 19 which extend through the deck 21. Magnetic heads 30, 31, and 32 are located between the pressure rollers 28 and 29. The pressure rollers 28 and 29 and the heads 30, 31, and 32 are partially enclosed by the raised portion 33 of the escutcheon 22. An opening 34 is formed in the raised portion 33 of the escutcheon 22. A dial (not shown in FIGURE 1) for indicating the portions of the record being scanned by the heads is located below the escutcheon 22 and may be viewed through the opening 34.

A capstan 35 is disposed adjacent the pressure roller 28 for cooperation therewith. Another capstan 36 is disposed adjacent the other pressure roller 29. The capstans 35 and 36 are rotated in opposite directions. Thus, tape drive in opposite directions may be provided by alternate actuation of the different pressure roller and capstan assemblies.

Pressure pads 37, 38 and 39 are adapted to cooperate with the magnetic heads 30, 31 and 32, respectively. These pressure pads 37, 38, and 39 are mounted at the ends of members 40, 41, and 42, respectively. The pad mounting members are pivotally secured to the tape deck 21 near the bottom of the heads. The pressure pads are pivoted away from the heads when it is desired to load the cartridge on the machine and during fast reeling operations.

A pair of tape guide elements 43, and 44 are disposed adjacent opposite sides of the centrally located head 31. It will be observed that an opening 45 is made in the deck 21. The pivotally mounted pressure pad support members 40, 41, and 42 extend through this opening 45 and are connected to actuation apparatus which causes the pivotal movement thereof.

Several elements are provided for cooperation with the cartridge in addition to those tape driving, guiding and transducing elements heretofore mentioned. These elements are an L-shaped backing bar 46. A pin 47, which is secured to the deck 21, is disposed near the center of the backing bar. A pair of shafts 48 and 49 extend through openings in the deck. Coupling disks 50 and 51 are mounted on the shafts 48 and 49, respectively. Coupling pins 52 and 53 are yieldably mounted on the coupling disks 50 and 51 near the periphery thereof. A pair of feeler pins 54 and 55 extend through openings 56 and 57 in the deck 21. These openings 56 and 57 are longer than the diameter of the pins 54 and 55, and the pins are reciprocally movable therein. These feeler pins 54 and 55 contact the tape and sense the tension therein. The feeler pins 54 and 55 are connected to mechanism for automatically initiating successive reeling operations in opposite directions.

Three magnetic heads are shown in FIGURE 1. The heads 30 and 32 operate as recording or reproducing heads. The head 31 operates as an erase head during recording and is made inoperative during reproduction. Two of the heads 30 and 32 have a pair of cores and are operative to record or reproduce two different record tracks on the tape. The recording and reproduction apparatus provided by the invention and illustrated in the drawings is operative to record four adjacent longitudinal record tracks on the tape. The signal gaps of the cores in each head are in alignment with each other. However, the pair of cores in one of the heads 30 is staggered laterally across the width of the tape from the pair of cores in the other head 32. The head 30 is adapted to record or reproduce the two record tracks which will be interleaved with two different record tracks which may be recorded or reproduced with the other head 32. The erase head 31 is also provided with two cores and is adapted to either simultaneously or alternately erase any one or two of the tracks recorded by the heads 30 and 32. In order to select which two of the tracks are to be engaged by the core elements of the erase head 31, the erase head is mounted for lateral movement up and down, by mechanism which coordinates erase head movement with the direction of tape travel. Thus, four tracks may be recorded by means of the magnetic heads incorporated in the illustrated machine.

For stereophonic recording or reproduction, any two of the tracks may be simultaneously recorded, reproduced or erased. The tracks may be recorded in one direction on two of the tracks and in the opposite direction on the other two tracks. Thus, the recording or reproduction time is doubled for stereophonic sound recording or reproduction. For monaural recording, four tracks may be recorded successively. It will be desirable to record the first track with one of the core elements of one of the heads 30. This first track may be disposed adjacent one edge of the tape. The next track may be recorded with the other head 32 during the opposite direction of tape travel. The second track may be located adjacent the opposite edge of the tape. The third track may be disposed adjacent the second track. This third track is recorded with the head 30 that recorded the first track and in the same direction on the tape as that in which the first track was recorded. The fourth track may then be recorded in the same direction as the second track by the head 32. This fourth track may be recorded between the third track and the first track. Since different ones of the heads 30 and 32 scan adjacent tracks on the tape, crosstalk between adjacent tracks is substantially reduced, and it is possible to record as many as four tracks on standard tape which is only one-quarter inch wide.

In FIGURE 2, a cartridge 60 is shown mounted on the deck of the machine. The machine is disposed in the start position as indicated on the dial viewed through the opening 34. In the start position, the machine is ready to receive the cartridge. As will be seen in FIGURE 2, the pressure rollers 28 and 29 are disposed away from the capstans 35 and 36. The pressure pad mounting members 40, 41, and 42 are pivoted away from the heads 30, 31, and 32. The tension feeler pins 54 are moved inwardly toward each other and away from contact with the tape. The cartridge 60 is inserted by being placed against the backing bar 46, with the pin 47 located within a notch 73, and dropped. When the cartridge is disposed in place on the machine, the pressure rollers and heads are disposed on one side of the path of tape travel in the cartridge while the capstans and pressure pads are disposed on the opposite side of the tape path.

Figure 4:
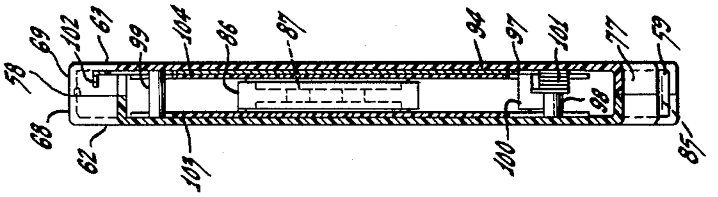
FIGURE 4 is a sectional view taken along the line 4—4 on FIGURE 3 and viewed in the direction of the appended arrows.
Figure 3:
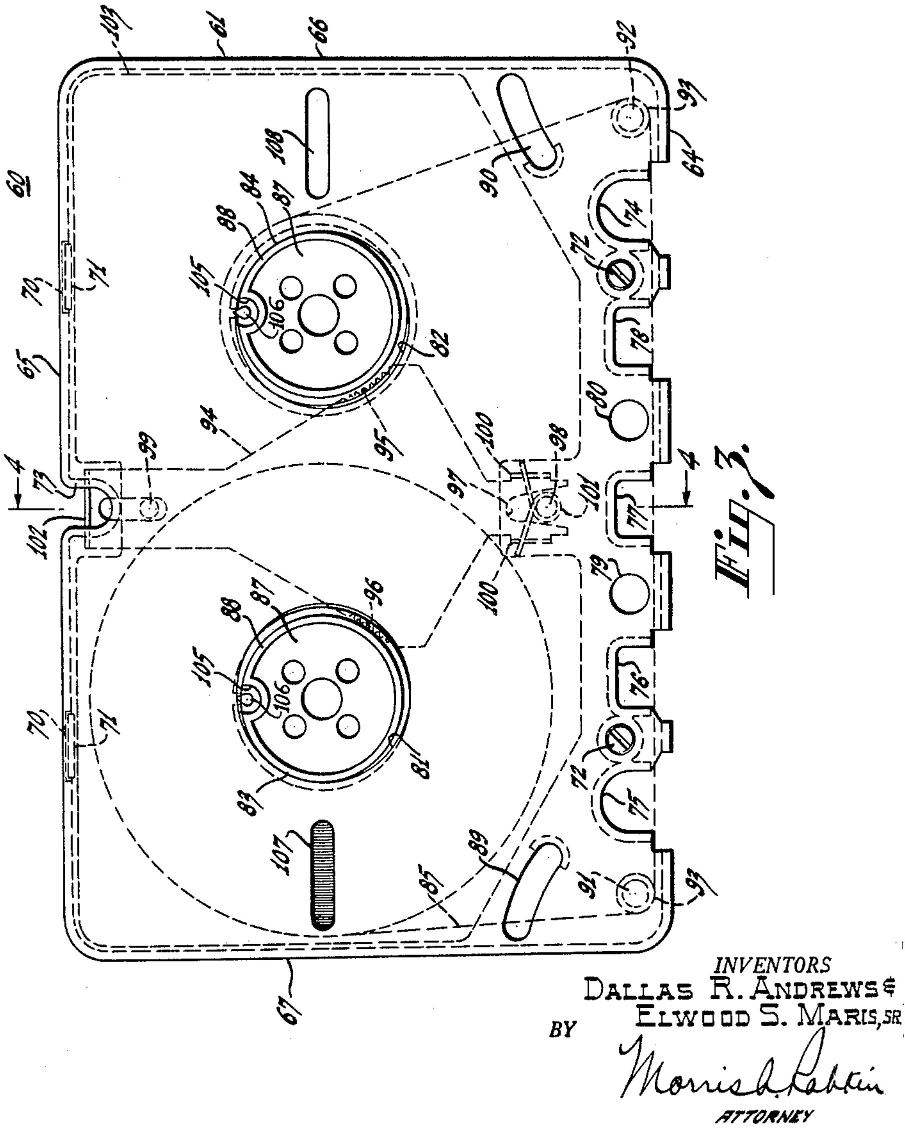
FIGURE 3 is a top plan view of the cartridge shown in FIGURE 2 removed from the recording and reproducing equipment.

The cartridge will be seen in greater detail in FIGURES 3 and 4. The cartridge itself is a rectangular casing 61 having wide top and bottom walls 62 and 63. The front wall 64, rear wall 65 and side walls 66 and 67 of the cartridge are quite narrow. For example, the top and bottom walls of the cartridge may be five inches wide and seven inches long. The side walls, front wall and rear wall of the cartridge may be only one-half inch high. The cartridge may be constructed of some suitable plastic material such as polystyrene. The cartridge may be formed in two half parts, 68 and 69. The junction 58 of these two parts is in the side, front, and rear walls of the cartridge. The two half parts 68 and 69 of the cartridge are located in exact position by means of cooperating recesses 70 in the bottom part 69 and extensions 71 in the upper part 68. These recesses and extensions are located in the rear wall of the cartridge 60. Further locating recesses and cylindrical extensions are disposed around openings for screws 72 which are used to fasten together the two half parts 68 and 69 of the casing 61. The rear wall 65 of the cartridge is provided with a notch 73. This notch is located approximately in the middle of the rear wall 65. When the cartridge is inserted on the tape deck under the top of the backing wall, the locating pin 47 enters the notch 73 to properly position the cartridge 60 against the backing bar 46.

The front wall of the cartridge is provided with a plurality of recesses of predetermined configuration. The recesses 74 and 75, which are closest to the side walls, are adapted to receive the capstans 35 and 36. The pressure pads mounting members 40, 41, and 42 are received by the rectangularly shaped recesses 76, 77, and 78, respectively. A pair of holes 79 and 80 are located near opposite sides of the recess 77. The guide elements 43 and 44 are received within these holes 79 and 80. It will be noticed that each of the recesses 75, 76, 77, 78 and 74 is widened at its mouth. Openings are provided in the cartridge in the portions of the recesses at their enlarged mouths. One of these openings in the recess 77 is shown at 59 in FIGURE 4. It will be observed that a linear path for travel of the tape 85 extends through these openings.

A pair of openings of a circular nature are provided in the top wall 63. A similar pair of circular openings are disposed in the bottom wall 62 which are opposite to the openings in the top wall 63. A pair of hubs 83 and 84 around which the magnetic tape 85 is wound are disposed within these openings. Each hub has a web 87, a cylindrical section 88 at the periphery of the web, and a central portion 86 in the cylindrical section 88. The diameter of the cylindrical section 88 of the hubs 83 and 84 is smaller than the diameter of the openings 81 and 82 so that the hubs may move freely in a lateral direction within their respective openings. The central portion 86 is of enlarged diameter so that, once the hubs are disposed in the cartridge, they cannot fall out. A hole for receiving the shafts 48 and 49 is disposed in the center of the web 87. Four holes for receiving the coupling pins 52 and 53 are disposed around the central shaft hole. A recess 105 is provided in the cylindrical section 88 of the hubs. A pin 106 is located in the recess 105 around which the end of the tape 85 is looped to anchor the tape to the hub.

Each of the top and bottom walls of the cartridge has opposed, elliptically shaped openings 89 and 90 through which the feeler pins 54 and 55 extend. The tape 85 traverses a path over the feeler pins and around a pair of guides 91 and 92 which are formed in the cartridge. These guides may be surrounded by smooth, metal collars 93 for reducing the friction between the guides and the tape as the tape passes over the guides. The tape 85 extends between the guides 91 and 92 along the linear path threaded through the openings at the mouths of the recesses 75, 76, 77, 78, and 74 and across the recesses. It will be observed that, when the cartridge is disposed in place on the machine, the tape will enter between the separated pressure rollers and capstans and the separated pressure pads and heads, since the linear path among these elements coincides with the path of tape travel established in the cartridge. Thus, automatic and convenient loading of the cartridge in the machine is obtained.

Means are provided for braking and locking the reel hubs 83 and 84 against rotation so that the tape will not unwind and become tangled within the cartridge. It will be appreciated that the hubs 83 and 84 are loosely disposed within the openings 81 and 82. Upon turning of these hubs, the tape is released and may become folded and tangled within the cartridge. Without the braking means, tape from one of the hubs may wind around the other hub. Thus, if the cartridge were inserted in the machine for operation and tape reeling started, it would be possible to extensively damage the tape.

To eliminate these difficulties, there is provided a braking or locking member 94 for the hubs. This member is illustrated as being a thin plate of metal, such as aluminum. If desired, a recess may be formed in the wall 63 of the cartridge into which the plate member 94 may be inserted. The member is located between the hubs 83 and 84 for lateral movement in a direction from the front wall 64 of the cartridge to the rear wall 65 thereof. It will be noted that the braking member 94 has inclined edges which are adapted to engage the periphery of each of the hubs 83 and 84. Portions 95 and 96 of these inclined edges are serrated. The end of the member 94 nearest the front wall 64 of the cartridge is notched. The notch 97 is adapted to receive a post 98 which is upstanding from the wall 63 of the cartridge. The post 98, together with another upstanding post 99, positions the braking member 94 in the aforesaid location between the hubs for movement back and forth between the front wall and rear wall of the cartridge. It should be noted that the diameter of the post 98 is much smaller than the width of the notch 97 so that the member 94 has a measure of freedom of motion from side to side in a direction between the walls 66 and 67. An opening in the rear end of the member is adapted to receive the post 99.

The front end of the member 94 is provided with projections 100, disposed parallel to the side walls 66 and 67, as shown in the drawing. A hairpin type coil spring 101 is wound around the post 98. The ends of the spring fit into notches in the projections 100. The member 94 is, therefore, biased toward the rear wall 65 of the cartridge 60, thus bringing the serrated edges 95 and 96 into contact with the peripheries of the hubs 83 and 84. A projection 102 extends parallel to the rear wall 65 of the cartridge 60 from the rear end of the braking member 94. This projection 102 is adapted to be engaged by the locating pin 47 on the tape deck 21 so as to force the braking member toward the front wall 64 and out of engagement with the hubs.

In operation, the inclined edges of braking member 94 are in engagement with the peripheries of the hubs 83 and 84 at the serrated portions 95 and 96, when the cartridge 60 is removed from the machine for storage. It will be observed that those portions of the peripheries of the hubs 83 and 84 which are diametrically opposite from the portions of the hubs which engage the serrated edges 95 and 96 of the member 94 are gently urged into contact with the inner periphery of the holes 81 and 82. Thus, each of the hubs 83 and 84 is kept from rotating to unwind tape by reason of peripheral frictional contact at two points thereon. This two-point peripheral contact provides the further feature of jamming the hubs in the holes 81 and 82 so that they cannot move in the direction to unwind tape therefrom. However, the hubs may undergo limited rotation in a direction to wind the tape thereon. This feature is desirable since it is important to maintain tension in the tape. If no tension was maintained in the tape, the tape might become loose along its path of travel through the holes and across the recesses 75, 76, 77, 78, and 74 in the front wall 64 of the cartridge. Thus, the tape may be caught accidentally on some foreign object external to the cartridge and broken. Alternatively, the tape may be easily crushed when it is stored in a compartment adjacent a wall or other non-yieldable objects.

This jamming action results because the component of force applied to the hubs by the inclined edges of the braking member wedges the hubs between the braking member 94 and the periphery of the wall at each of the holes 82 and 81. When the hubs turn in a clockwise direction for the hub 83 and in a counterclockwise direction for the hub 84, such rotation tends to pivot the braking member 94 for side-to-side movement about the post 99, which is located near the rear end of the member 94. The hubs may then rotate in a direction to wind tape thereon. However, the hubs become jammed in the holes when they rotate in a direction to unwind tape therefrom.

It will be noticed that the locking mechanism comprises merely the single member 94 and the spring 101. This is a construction of lowest possible cost. Moreover, the braking and locking action is highly efficient. This construction has the additional advantage of applying equal braking forces to each of the reels, since the member 94 is disposed between the hubs 83 and 84. The tapered, enlarged notch 97 permits the member 94 to swing or shift slightly from side to side to apply equal braking forces to each of the hubs. This equalizes wear on the hubs and, therefore, increases the life expectancy of the cartridge over the life of such mechanisms as apply forces to one of two reels. It should be noted that the projections 100 and 102 are slightly shorter than the internal height of the cartridge. This prevents the braking member from moving in a vertical direction and maintains it properly positioned upon the wall 63 thereof.

Means are provided for preventing the magnetic tape from binding within the cartridge. These means have the further feature of guiding the tape through the cartridge between the top and bottom walls 62 and 63 thereof so as to make it unnecessary for any drag tension to be applied to the hubs from which the tape is being unreeled. This latter feature simplifies the tape driving mechanism since it eliminates the need for any clutch arrangement in the hub drives. Another feature of the means for preventing binding of the tape within the cartridge is that annoying squealing sounds which might result from the variable coefficient of sliding friction between the tape and the walls of the cartridge are eliminated.

It will be appreciated that the cartridge is manufactured from plastic material, such as polystyrene. The magnetic tape which will be used with the normal standard tape cartridge may be standard magnetic tape comprising a base of cellulose acetate film which is coated with some retentive magnetic material, usually a hard iron oxide. This tape will be in edge contact with the plastic walls of the cartridge. The magnetic oxide is an abrasive material. It has been found that there is a high coefficient of friction between the tape and the material of the cartridge. Thus, when the tape slides over the cartridge sufficient heat is generated to melt the internal walls of the cartridge and to form grooves therein, such grooves cause the tape to tilt and not travel properly between the walls of the cartridge. Moreover, the coefficient of sliding friction varies such as to cause annoying squeals and screeches as the tape slides over the walls.

All of the foregoing difficulties are obviated by reason of the inclusion of liners adjacent the walls 62 and 63 of the cartridge 60. These liners may be sheets 103 and 104 of plastic material, of material such as Mylar, having predetermined properties. Mylar is a trade name for a saturated polyester resin. The nature and characteristics of Mylar are explained in an article entitled, "Polyester Resins," appearing in Modern Plastics, Encyclopaedia Issue for September 1954. The sheets 103 and 104 are formed to cover the portions of the walls 62 and 63 on which the reeled tape rests. The largest amount of sliding contact occurs at the large areas of reeled tape around the hubs 83 and 84, as the hubs rotate. The liners 103 and 104 are disposed between the bottom edge of the tape and the walls of the cartridge. It will be observed that the bottom sheet 104 also serves to cover the braking member 94 and facilitate its sliding motion on the bottom wall 63 of the cartridge. The sheets serve the additional function of closing the cartridge against introduction of dust and foreign elements through a pair of viewing openings 107 and 108. The quantity of tape remaining on the hubs and the amount of reeling time remaining for tape travel in any direction may be observed by peering through these viewing openings 107 and 108. A pair of the viewing openings 107 and 108 may be disposed in each of the walls 62 or 63 of the cartridge so that the tape may be viewed although the cartridge is turned over on the machine.

The addition of the sheet liners 103 and 104 provides the additional features of guiding the tape between the top and bottom walls of the cartridge and providing sufficient tension in the tape to eliminate the need for drag tensioning means on the hubs. A film of air providing an air cushion will be formed between the sheets and their adjacent walls of the cartridge. This cushion of air in combination with the sheet provides a damper for properly and smoothly retarding the movement of the tape in a transverse direction between the upper and lower walls of the cartridge 62 and 63. This air cushion also functions to acoustically damp any sound and vibration of the tape as it slides over the walls of the cartridge and over the liners. This sound damping provides additional means for eliminating any noise in the cartridge. Squeals due to variable coefficient friction are eliminated by the characteristics of the liners themselves.

The characteristic of the liners which provides yieldable pressure and drag on the tape as it moves has the additional feature of eliminating jitter, wow and flutter in the tape because all erratic tape motions are damped by reason of the air cushion between the liner and the wall of the cartridge. It may be desired to increase the drag provided on the tape by the liner. This may be accomplished by pressing the liner sheet in a die to impress waves in the sheets 103 and 104. This may be accomplished by the die having waves formed therein. The die may be heated while the liner sheet is located therein.

While Mylar material has been found suitable as a liner sheet, any sheet material having the characteristics of low coefficient of friction with the tape and high melting temperature at microscopic depths will be suitable. It is to be noted that any hard material may not be sufficient. If the material is too hard, the annoying squeals and sounds due to variable coefficient of sliding friction will be increased. Moreover, the heat developed, while not sufficient to melt the material of the cartridge, may be sufficient to damage the tape.

The liners 103 and 104 make it unnecessary to provide the hubs with flanges to eliminate the adverse effects of sliding friction. Thus, the amount of tape that may be carried by the cartridge is increased by a considerable amount. More than one-half of the capacity of the cartridge would be lost if flanges were used. Thus, the use of a liner has the additional feature of increasing the tape carrying capacity of the cartridge.

It may be found desirable to provide elements, in addition to the guide elements 43 and 44 projecting from the tape deck 21, for example, such elements may be adapted to project through holes in the cartridge located within the guides 91 and 92. Alternatively the guide elements 43 and 44 may be spaced more widely apart. These provisions may make it more convenient to precisely locate the cartridge in position upon the tape deck 21.

Figure 5:
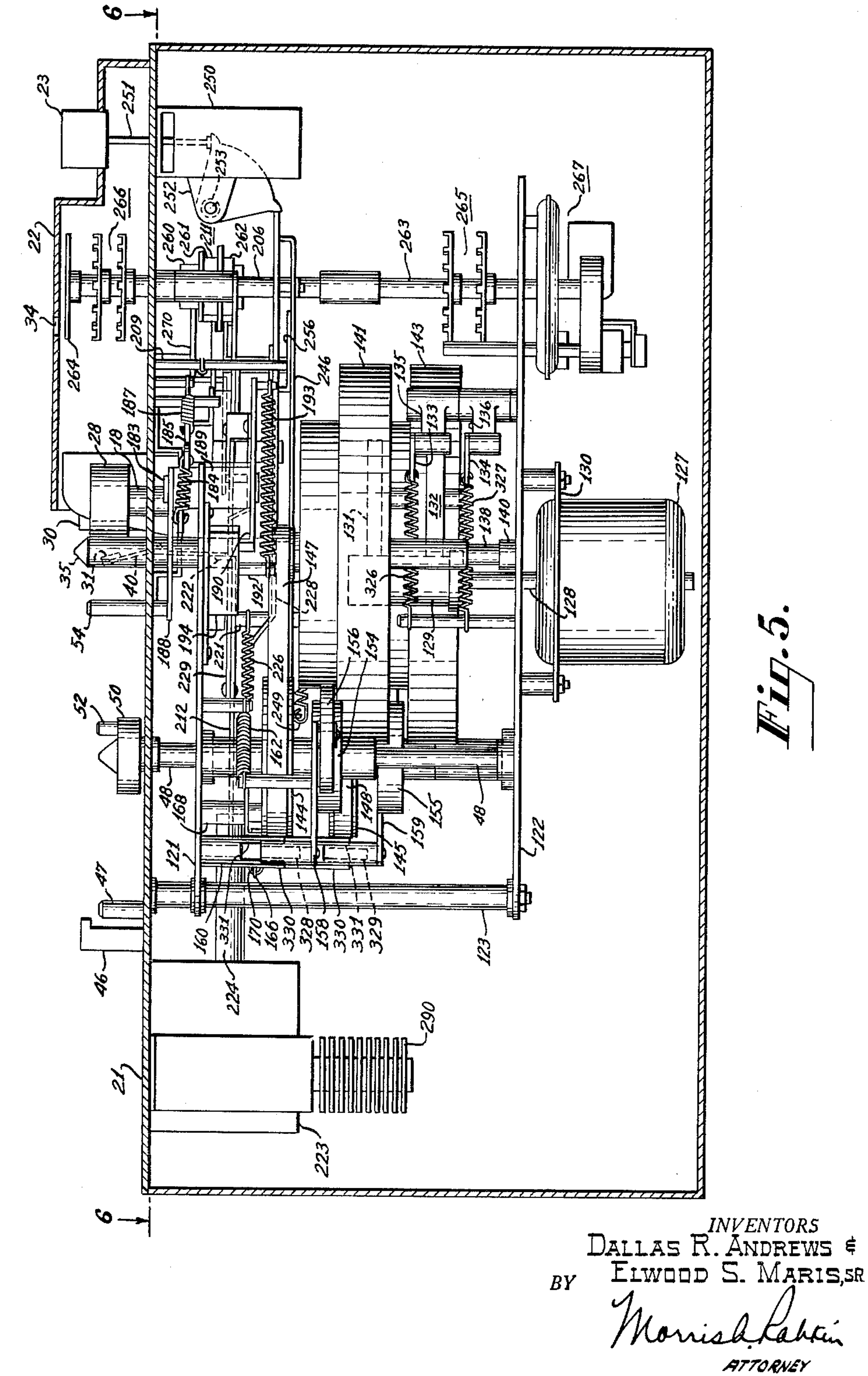
FIGURE 5 is a sectional side view of the equipment shown in FIGURE 1, the section being taken with the left side of the housing and escutcheon removed.
Figure 6:
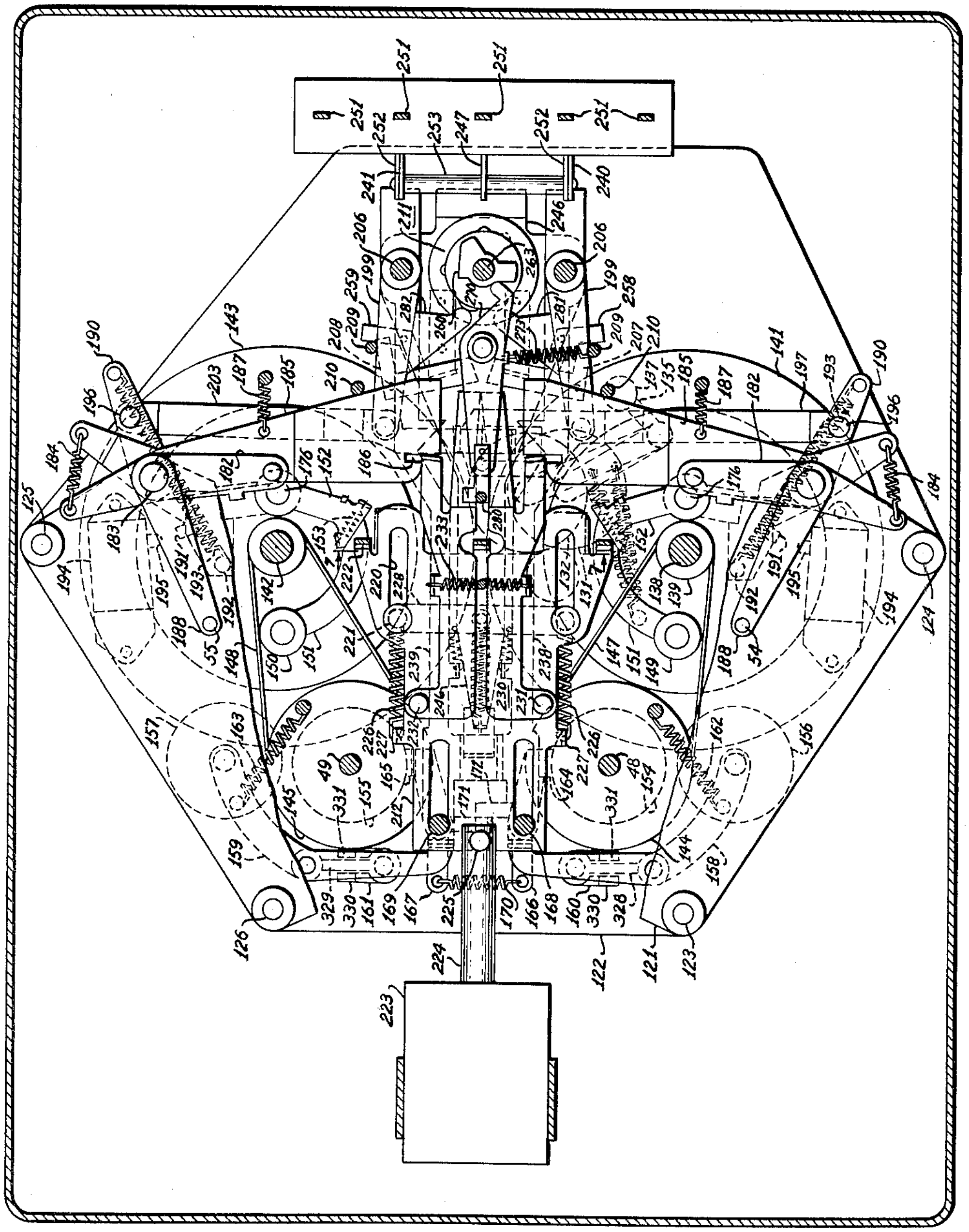
FIGURE 6 is a sectional view taken along the line 6—6 of FIGURE 5 and viewed in the direction of the appended arrows.
Figures 7, 9, 13:
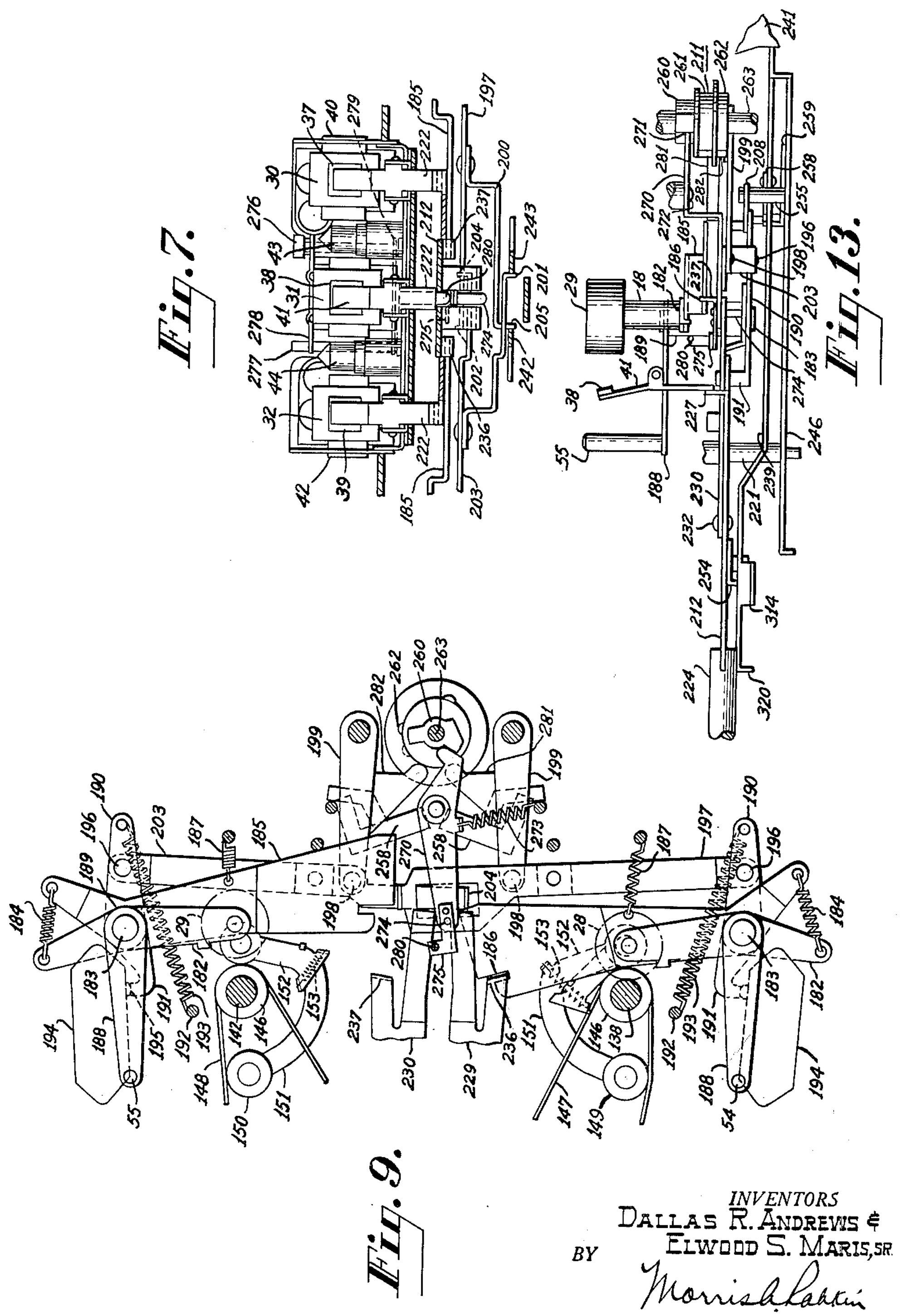
FIGURE 7 is a fragmentary section view taken along the line 7—7 of FIGURE 6 and viewed in the direction of the appended arrows.
FIGURE 9 is a simplified, fragmentary, sectional plan view of the equipment shown in FIGURES 1, 2, and 5 to 7 with some of the parts removed and showing some of the various elements as disposed during another operating condition of the machine.
FIGURE 13 is a fragmentary side elevation view showing the arrangement of slide members with some of the other parts removed.

The mechanism of the tape recording and reproducing equipment shown in FIGS. 1 and 2 will be best observed in detail in FIGS. 5, 6 and 7. The major portion of the mechanism is supported between a pair of support plates 121 and 122. These plates 121 and 122 are secured to the deck 21 by means of four support rods 123, 124, 125 and 126. Flanges at the end of the rods 123 to 126 are fastened, as by being riveted, to the deck 21.

Driving power for the tape recording and reproducing equipment is supplied by an electric motor 127. This motor may be of the synchronous type. The shaft 128 of this motor is connected to an enlarged puck 129. The motor and shaft are supported on the lower support plate 122 by means of a bracket 130.

A pair of idler rollers 131 and 132 are mounted on arms 133 and 134. These arms are pivotally mounted on brackets 135 and 136. These brackets are both secured to a post 137 on the lower support plate 122. The capstan 35 is provided by the end of a shaft 138. This shaft is journaled in a bearing 139 and in another bearing 140, secured to the upper and lower support plates 121 and 122, respectively. A stepped capstan flywheel 141 is mounted on the shaft 138.

Another shaft 142 extends through the deck 21. This shaft 142 is similar to the shaft 138 and provides the capstan 36 at the end thereof extending through the deck 21. Another stepped capstan flywheel 143 is mounted on the shaft 142. The capstan flywheels are hollow cylindrical members. The idler 131 is biased by a spring 326 into frictional contact wtih the flywheel 141 along the inner periphery thereof and with the puck 129. The idler 132 is biased by a spring 327 into frictional peripheral contact with the puck 129 and the outside of the capstan flywheel 143. Thus, upon rotation of the motor 127 in one direction the capstans 35 and 36 may be driven through the idler rollers 131 and 132 in opposite directions.

The hubs 83 and 84 in the cartridge 61 are driven through the coupling disks 50 and 51. These coupling disks are secured to the ends of different shafts 48 and 49. These shafts 48 and 49 are supported in bearings mounted on each of the support plates 121 and 122. A pulley 144 is mounted on the shaft 48 and another pulley 145 is mounted on the shaft 49. Each of the shafts supporting the capstan flywheels is provided with a pulley 146. The pulleys 144 and 145 are respectively adapted to be coupled to the pulleys 146 on the shafts 138 and 142 by means of a pair of belts 147 and 148. The belts are normally loosely disposed on the pulleys 144, 145 and 146. The pulleys may be provided with grooves for receiving the belts. A pair of jockey rollers 149 and 150 (FIG. 6) are disposed inside the belts 147 and 148 to tighten the belts. The disposition of the jockey rollers 149 and 150 inside the belts 147 and 148 insures continuous coupling without vibration or oscillation in the drive. Since the capstan shafts 138 and 142 rotate in opposite directions, the hub shafts 48 and 49 may be selectively rotated in opposite directions to wind the tape on the hubs at relatively slow speeds during recording and reproducing operations. The rollers are rotatably secured on the arms 151. The arms 151 are pivotally mounted in journals around posts 176 which depend from the top support plate 121. The jockey roller arms 151 are in juxtaposition with other arms 152. Each of the arms 151 and 152 is independently pivotally mounted in the journals. The arms 151 and 152 have projections which are connected together by means of springs 153. In order to tighten the belts 147 and 148, the upper one of the arms 152 is advanced toward its respective belt so as to resiliently urge the other arm 151 which carries the roller 150 into contact with the belt 148 or 147.

Each of the hub drive shafts 48 and 49 is supplied with a different high speed drive puck 154 and 155, respectively. A pair of idler rollers 156 and 157 are pivotally mounted on individual arms 158 and 159. These arms are pivoted on bearings at the ends of other arms 328 and 329. These other arms 328 and 329 are journaled on supporting stud members 160 and 161, respectively. The stud members 160 and 161 are both mounted on the top support plate 121. Parallel spaced projections 330 and 331 extend from opposite sides of the stud members 160 and 161, and the arms 328 and 329 are disposed between the projections 330 and 331. The arms 158 and 159 are biased by means of springs 162 and 163 to pivot on the other arms 328 and 329 so as to bring the idler rollers 156 and 157 into frictional contact with the high speed drive pucks 154 and 155 and the upper step of the capstan flywheels 141 and 143, respectively. The high speed drive pucks 154 and 155 are, however, normally maintained out of frictional contact with the capstan flywheels 141 and 143 by virtue of the control slides 238 and 239, to be described in detail hereinafter. Projections at the ends of the slides 238 and 239 engage cooperating projections at the ends of the idler roller arms 158 and 159 opposite from the idler rollers 156 and 157.

The pivotally associated idler roller arms 158 and 159 and journaled arms 328 and 329 provide double acting or knee acting systems which facilitate self alignment of the idler rollers 156 and 157 between the pucks and capstan flywheels. The projections 330 and 331 on the stud members 160 and 161 restrict the knee action to limited movements thereby preventing interference with other mechanisms.

Brakes are provided which operate on the high speed drive pucks 154 and 155 in order to stop rotation of the shafts 48 and 49. These brakes include felt pads 164 and 165. The pads 164 and 165 are mounted on the ends of a pair of bell crank arms 166 and 167. These arms 166 and 167 include sleeves 173 and 174 which are journaled around support posts 168 and 169. The ends of the arms 166 and 167 are connected together by way of a spring 170 so as to bias the pads 164 and 165 normally into contact with the pucks 154 and 155. Operating levers 171 and 172 are provided as part of the brake bell crank arms 166 and 167 for pivoting the arms so as to bring the pads 164 and 165 out of braking engagement with the pucks 154 and 155. The levers 171 and 172 may be connected to one end of the sleeve and the arms 166 and 167 may be connected at the opposite end of the sleeves 173 and 174.

Slow reeling operations are obtained by the use of the capstan and pressure roller assemblies 35, 28 and 36, 29. The pressure rollers 28 and 29 are mounted for movement towards and away from capstans 35 and 36, respectively. Each of the pressure rollers 28 and 29 is independently actuated. Since the pressure roller mechanisms are substantially similar only that mechanism which is associated with the pressure roller 28 will be described in detail. Like reference numerals will designate like parts in each mechanism.

The pressure roller 28 is rotatably mounted on the shaft 18. This shaft 18 is secured to an arm 182. This arm 182 is journaled around a post 183. A portion of the arm 182 extends beyond the post 183, and is yieldably connected by means of a spring 184 to a pressure roller control arm 185. This arm 185 is also journaled around the post 183. The pressure roller control arm 185 has two portions which are disposed at an obtuse angle with respect to each other. These portions are on opposite sides of the post 183. The end of the longer portion has a notch 186 therein. This end is also formed with a curved corner and a square corner. The pressure roller control arm 185 is spring biased in a forward direction by means of a spring 187. No forces are then transmitted through the spring 184 to the arm 182 which actually supports the roller 28. Thus, the pressure roller 28 is normally maintained away from the capstan 35. However, when the pressure roller control arm 185 is pivoted in a rearward direction against the bias of the spring 187, the arm 182 and the pressure roller 28 are yieldably urged against the capstan 35.

Associated with the pressure roller actuating mechanism is another mechanism responsive to the tension in the tape as it is being reeled between the hubs of the cartridge. This mechanism includes the feeler pin 54. This pin 54 is attached at the end of an arm 188 which is journaled to the post 183. The post 183 then provides a common pivot and support for the tension responsive mechanism and the pressure roller control mechanism. A sleeve 189 is disposed around the post 183. The arm 188 which is connected to the feeler pin 54 is secured at the upper end of the sleeve 189. The lower end of the sleeve 189 is connected to another arm 190 having two portions disposed on opposite sides of the sleeve 189. One of these portions 191 has an extension shown as curved hook at the end thereof. The other portion of the arm 190 is connected to a post 192 on the upper support plate 121 by means of a spring 193.

A switch 194 is secured to the upper support plate 121. This switch may be designated as the left tape feeler switch and is of the single pole, double throw variety. This switch has a spring biased plunger 195 of the conventional type for actuation thereof. When the tape feeler pin moves in response to the tension of the tape it causes the arm 190 to which it is connected by way of the sleeve 189 to pivot about the post 183. The arm 188 is normally biased toward the side of the machine by the spring 193. Thus, the plunger 195 is normally depressed by the hooked portion of the arm 190. However, the arm 188 may be pivoted in the opposite direction against the tension of the spring 193; thus moving the hooked actuating end of the arm 190 away from the spring plunger 195.

The arm 190 is pivotally connected at 196 to a control arm 197 for the tension responsive mechanism. This control arm 197 is pivotally supported at 198 (FIG. 9) to a link 199. The end of the control arm 197 near the pivot point 198 is bifurcated (FIG. 7). This bifurcated end is provided by a lower and stepped portion 200 which may be riveted thereon. The stepped portion 200 is bent downwardly at the free end thereof to provide a downward projection 205. The upper portion of the bifurcated end of the control arm 197 is formed with an upstanding projection 202 at the free end thereof. Thus, the control arm 197 is provided with a bifurcated end having upstanding projections extending in opposite directions. The upper one of the bifurcated end portions has an opening therein for the passage of other elements of the machine, such as the control arm 203 of the tension responsive mechanism at the opposite side of the recorder.

This control arm 203 is bifurcated at its end similarly to the control arm 197. Projections 201 and 204 extend from the bifurcated ends of the arm 203 and in opposite directions from each other. An opening is provided in one of the bifurcated end portions of the arm 203 for the passage of the projection 205 from the lower portion 200 of the bifurcated end of the control arm 197.

A pair of links 199 are individually pivotally mounted on two posts 206. These links 199 are pivotally attached at 198 (FIG. 9) to the control arms 197 and 203 of the tension responsive mechanisms and move therewith. A pair of angle members 207 and 208 are separately pivotally mounted on the links 199 with adjacent ends thereof disposed at an angle with respect to each other. Stops 209 depend from the tape deck 21 so as to limit the pivotal movement of the angle members 207 and 208. Stops 210 also depend from the deck 21 to limit the movement of the pressure roller control arms 185 in a direction towards the front of the machine.

Control of the various mechanisms of the recording and reproducing equipment to achieve the desired recording and reproducing operations is achieved by means of an arrangement of control slides which cooperate with the pressure roller mechanism, the tape tension responsive mechanisms, the braking mechanisms, the capstan and hub drive mechanisms, and a cam selection arrangement 211. The slide arrangement may be viewed in FIG. 8 and in FIG. 13. The control slide arrangement includes a master slide 212. This master slide 212 is provided with a pair of elongated parallel openings 213 which extend lengthwise thereof. Another pair of openings 220 are disposed in the slide near the front thereof. The support posts 168 and 169 extend through these openings 213 and guide the slide 212. The front end of the slide is provided with three upstanding projections 222 which are spaced from each other so as to cooperate with the pressure pad mounting members 40, 41 and 42. Thus, when the slide 212 is moved toward the rear of the machine the pressure pads 37, 38 and 39 will be released to advance into contact with the heads 30, 31 and 32.

Driving power for shifting the master control slide 212 is obtained from a solenoid 223. This solenoid has a movable member or armature 224 which is connected to the rear of the master control slide 212 at 225. The master control slide 212 is biased towards the front of the machine by two springs 226 which are connected between the posts 221 and upstanding projections 227 on the slide 212. The solenoid 223, when operated, shifts the master control slide 212 rearwardly towards itself. A cross-bar support member 228, having openings near opposite ends thereof, is secured between the posts 221.

A pair of forked members are disposed on the master control slide 212. These forked members 229 and 230 form part of the master control slide mechanism. Each of the members is pivoted on the master control slide 212 at 231 and 232. The forked ends of the members 229 and 230 are formed with a step therein and extend to a plane below the plane of the master control slide 212. Each of the forked members is arranged side by side on the control slide. The forked members are connected together by means of a spring 233. The spring 233 is connected between upstanding projections along opposite edges of the forked members 229 and 230. The ends of the outer one of the forks on each of the forked members are turned upwardly to provide projections 236 and 237 which may be pivoted into the notches 186 in the pressure roller control arms 185.

Figure 10:
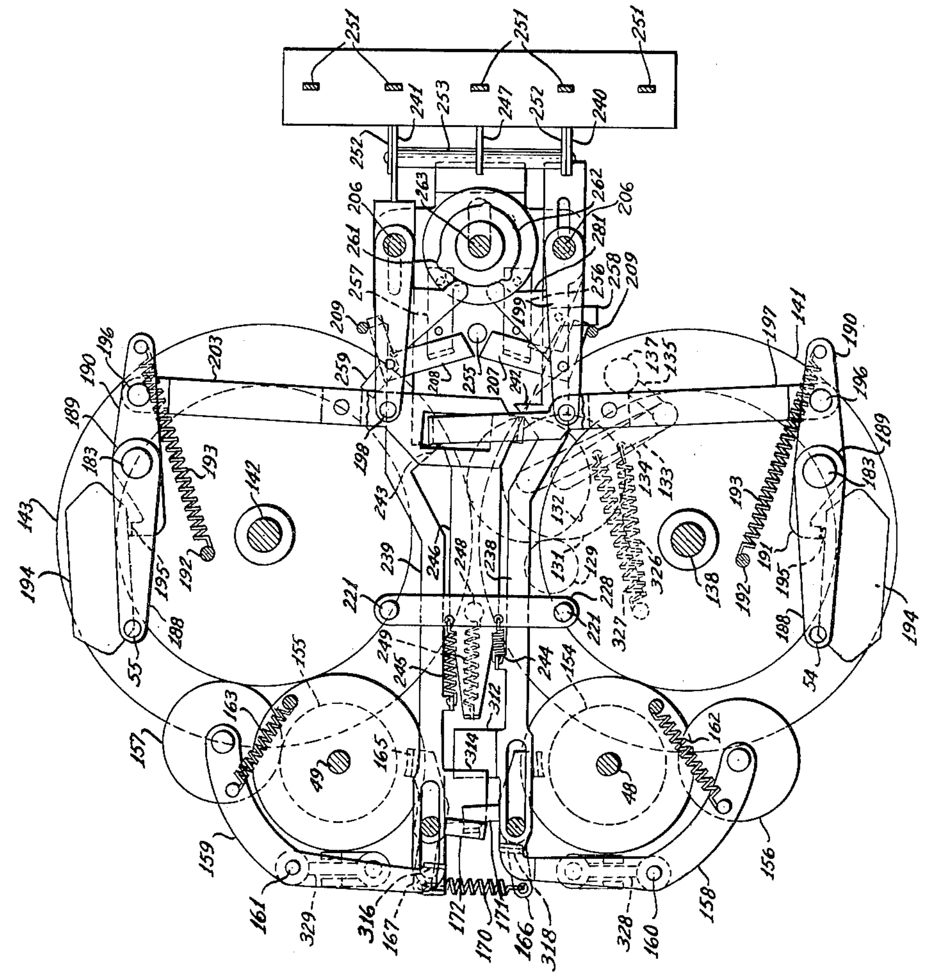
FIGURE 10 is a fragmentary, sectional, plan view of the equipment shown in FIGURES 1, 2, and 5 to 7 with certain of the parts removed showing other of various elements as disposed during one of the different operating conditions of the equipment.

A pair of slides 238 and 239, as may be best viewed in FIG. 10, are associated with the mechanism for conditioning the equipment for fast forward and reverse reeling operations. These slides 238 and 239 extend from the idler roller control arms 158 and 159 to the levers 240 and 241 which are actuated by the reverse and fast forward push buttons. The slide 238 which is actuated by the reverse push button, has an opening near the front end thereof which extends lengthwise thereof. One of the posts 206 extends through this opening and serves to guide the slide 238 for sliding motion. A guide opening is provided around the other post 206 in the fast forward slide 239. Similar guide openings are disposed around the rear posts 168 and 169. The fast forward and reverse slides have a stepped portion in their mid-sections so as to clear the cross-bar 228. The slides 238 and 239 are also bent inwardly near their mid-sections for convenience of arrangement. Angularly shaped projections 242 and 243 extend laterally from each of the slides 238 and 239 in the region thereof adjacent the bifurcated ends of the tension control arms 197 and 203 and are adapted to engage the arms 197 and 203. The reverse slide 238 and the fast forward slide 239 are biased into contact with the push button control levers 240 and 241 by means of springs 244 and 245 which are connected between the cross-bar 228 and upstanding projections on each of the slides 238 and 239.

A heart-shaped stop slide 246 is disposed immediately below the fast forward and reverse slides for actuation by the center one of the push buttons 25 through its control lever 247. This stop slide 246 is supported near the front end thereof on the posts 206. The rear end of the slide has an elongated opening therein through which a support post 248 extends. A spring 249 (FIG. 10) is attached between the support post 248 and the very end of the stop slide 246.

Figure 11:
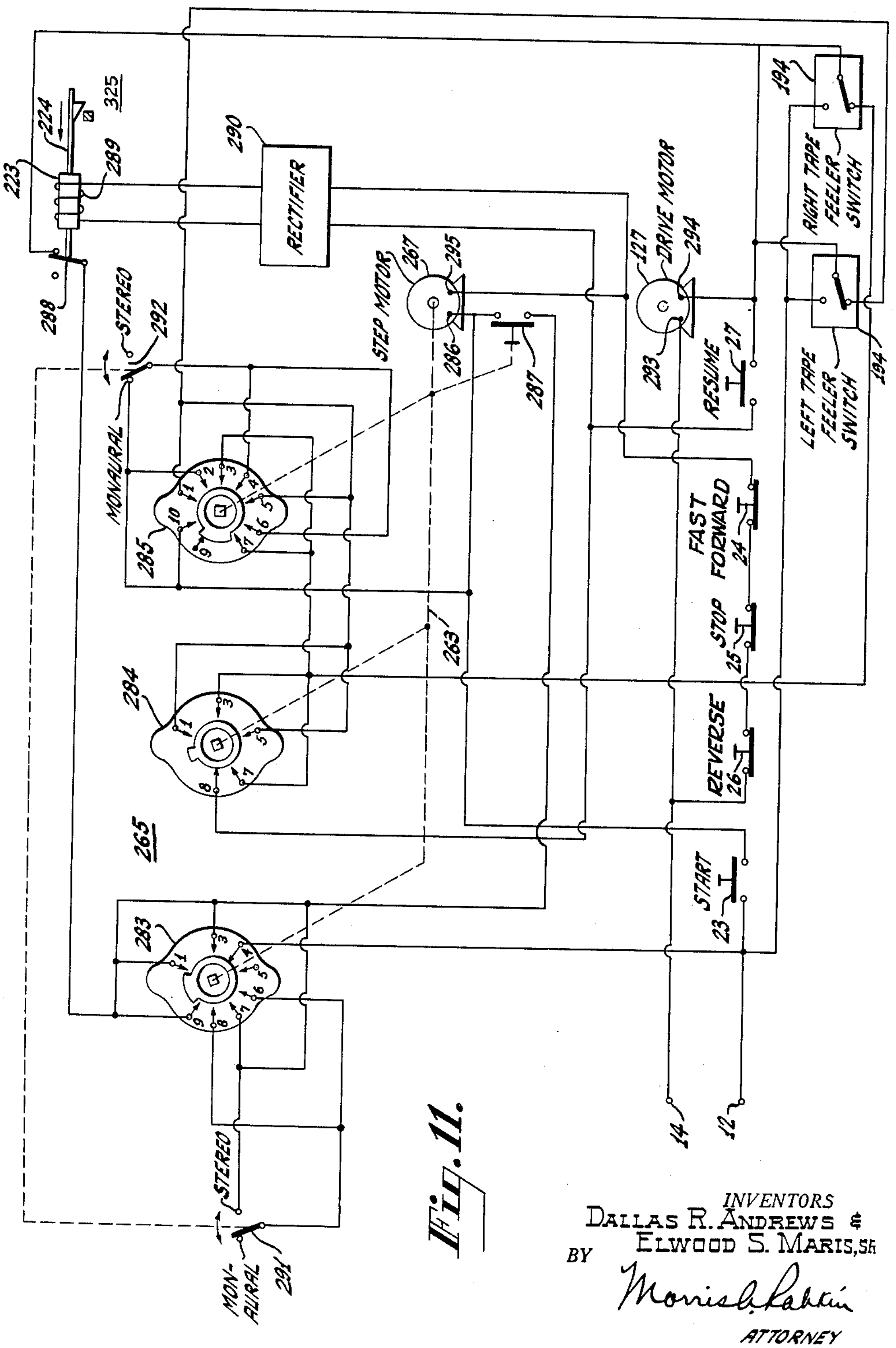
FIGURE 11 is a schematic diagram of certain of the electrical apparatus in the equipment illustrated in the foregoing figures.

The push button control mechanism (FIGS. 5 and 6) includes a plurality of push button operated switches of the conventional type which are disposed in a housing 250. The control rods 251 from the push buttons extend into this housing 250. A pair of support brackets 252 project from the side of the housing 250. A rod 253 is connected between the brackets 252. The sector shaped lever members 240, 247 and 241 are pivotally mounted on the rod 253 for independent movement. Each of the rods 251 which are actuated by the push buttons 23 to 27 has a lateral projection which engages the selected one of the levers 240, 247 or 241 so as to advance the desired slide towards the rear of the machine. These rods may be biased upwardly by springs (not shown). A number of electrical switches, some of which are shown in FIG. 11, are also located in the housing 250 and selected switches are actuated by contact with the rods 251.

The master control slide 212 has a downwardly extending rectangular stud 254 (FIG. 13) which cooperates with the levers 171 and 172 on the brake arms 166 and 167. Thus, when the solenoid 233 pulls in the brakes 164 and 165 are released from the pucks 154 and 155.

Another arrangement of studs extends from the stop slide 246. These include a cylindrical stud 255 and a pair of angularly oriented rectangular studs 256 and 257 (FIG. 10). It will be remembered that each of the links 199 has an angle member 207 and 208 disposed thereon. Other angle members 258 and 259 are secured to the reverse slide 238 and on the fast forward slide 239, respectively. The cylindrical stud 255 will be advanced between the angle members 207 and 208 on the links 199 for purposes of forcing these links laterally sidewise against the tension of the springs 193. This operation will release the slides and other elements as will be described hereinafter. The rectangular studs 256 and 257 perform a similar operation. These studs bear against the angle members 258 and 259 on the fast forward and reverse slides 238 and 239, when either the fast forward or either one of the reverse push buttons is pressed. This operation serves to advance the stop slide towards the rear of the machine should it be disposed in a position towards the front of the machine. The master control slide 212 and the mechanisms associated therewith will be released by the action of the cylindrical stud 255, as previously explained.

The selection of the various operating conditions afforded by the recording and reproducing equipment of the invention is obtained by means of a cam mechanism. Three cams 260, 261 and 262 are used. A control cam 260, which is disposed on top of the other cams, is the drive direction determining cam. Cams 261 and 262 are release cams for releasing the mechanism between different operating conditions of the machine. All three cams are coaxially mounted on a shaft 263. A dial 264 (FIG. 5) for indicating the operating condition of the machine by showing the number of the track or tracks on the tape on which information is being recorded or reproduced is disposed at the top of the shaft 263. The shaft also supports a plurality of stacked wafer switch assemblies 265 and 266. The cams are driven by means of a motor 267 which is supported on the bottom support plate 222. This motor serves to rotate the shaft 263 in discrete steps of seventy two degrees upon each energization thereof in this illustrative embodiment of the invention, and will be referred to herein as a step motor. Step motors of this type are commercially available and may be obtained, for example, from the Molon Motor Company, Chicago, Illinois. (Their Model No. X-1086-10 may be suitable.)

A control lever 270 is adapted to cooperate with the drive selection control cam 260. This lever 270 has a cam follower extension 271 which rides on the surface of the control cam 260. The lever 270 is pivoted on a post 272 which extends from the tape deck 221. The lever 270 is also stepped, as viewed in FIG. 5, in the form of a reversed Z, so as to fit among the slides. A spring 273 which is connected to a post 209 and to the lever 270 maintains the cam follower extension 271 in contact with the cam 260. The end of the lever 270 opposite from the extension 271 is provided with a downward extending pin 274 (FIG. 13). The pin 274 extends between the inner ones of the forks of the forked members 229 and 230. It follows that as the cam 260 rotates the pin 274 will be shifted laterally either to the left or to the right for the purposes of either bringing the forked member 229 or the forked member 230 into operative engagement with either one of the pressure roller control members 185.

The control lever 270 also cooperates with the erase head 31 of the head assembly 30, 31 and 32. This cooperative arrangement will be seen best in FIG. 7. An L shaped member 275 of spring steel, for example, is riveted to the end of the lever 270 from which the pin 274 extends. This member 275 is stepped. The purpose of this member 275 is to raise the erase head 31 from the position shown in FIG. 7 to an elevated position when the lever 270 is pivoted in a counter-clockwise sense, as viewed in FIG. 6.

The erase head assembly incudes a pair of posts 276 and 277. The erase head 31 is mounted between a pair of brackets 278 and 279 which are slidably mounted for vertical movement on the posts 276 and 277. A pin 280 extends downwardly from the bottom bracket 279. Thus, when the control lever 270 is pivoted in a counter-clockwise direction by the action of the cam 260 the erase head will be raised by the upper step of the member 275.

The release cams 261 and 262 are generally cylindrical in shape. Each cam is separately provided with three projections which are spaced from each other around its circumference. The links 199 each cooperate with a different one of the release cams 261 and 262. These links 199 have cam follower portions 281 and 282 as integral parts thereof. When the link followers 281 and 282 rest upon any of the projections on the release cams 261 or 262 the links are forced laterally apart so as to more widely separate the tension sensing control arms 197 and 203. The arms 188 carrying the feeler pins 54 and 55 are then advanced towards each other into the position shown in FIG. 6. The presence of the release cams 261 and 262, in cooperation with the link cam followers, assures that the mechanism will be released between different operating conditions of the equipment. This feature tends to contribute to the fool-proof operation of the equipment.

FIG. 11 shows the electrical equipment which, in combination with the mechanism heretofore described, provides for automatic operation of the recording and reproducing equipment provided by the invention. The electrical equipment is shown as being disposed in the start condition of operation.

Power is supplied from a pair of terminals 12 and 14 which may be connected to the power lines. The terminal 14 is connected to the drive motor 127. This is the motor which drives the capstans 35 and 36 and the hubs 82 and 83 in the cartridge 60. Power for the drive motor 127 is available from the terminal 12 through a plurality of selected paths. These paths are provided by the electrical conductors and through the illustrated switches. Switches are associated with the start push button 23, the reverse push button 26, the stop push button 25, and the fast forward push button 24. The switches in the start and resume push buttons 23 and 27 are biased in the conventional manner to be normally open. The reverse, stop and fast forward push button switches 26, 25 and 24 are biased to be normally closed. The wafer switches 265 are included in the electrical apparatus. These switches are a first wafer switch 283, which controls the duration of application of power to the step motor 267 and, at times, to the drive motor, and may be referred to as the motor control switch. A second wafer switch 284 determines the timing of the solenoid operations and may be referred to as the solenoid control switch. The solenoid 223 will be energized at times determined by the arrangement of contacts on a third wafer switch 285. The third wafer switch 285 functions to connect a selected one of the left tape feeler switch and right tape feeler switch 194 into a circuit for initiating the operation of the step motor, and may be referred to as the feeler switch selector switch. All of the wafer switches 283, 284 and 285 are ganged in that they are coupled for simultaneous rotation with the cam shaft 263. The step motor also includes a holding switch 287 which is connected to one of its terminals 286. This switch 287 is connected to the shaft of the step motor and forms a part thereof. It is normally open and closes only when the step motor is rotating. The solenoid 223 is shown having back contacts 288. The solenoid 223 has operating winding 289 which is energized by the output current of a rectifier 290. This rectifier 290 may be of the conventional bridge type. The rectifier 290 is also shown in FIG. 5, as being disposed adjacent to the solenoid 223.

It was mentioned heretofore that the magnetic recording and reproducing equipment which is provided by the present invention is adapted for either monaural or stereophonic sound recording and reproduction. During stereophonic sound reproduction, two of the record tracks on the tape are used simultaneously. In order to achieve stereophonic operation in an automatic manner it is necessary only to actuate the monaural-stereo switches 291 and 292. These switches may be ganged together and operated by a single control.

Figure 12:
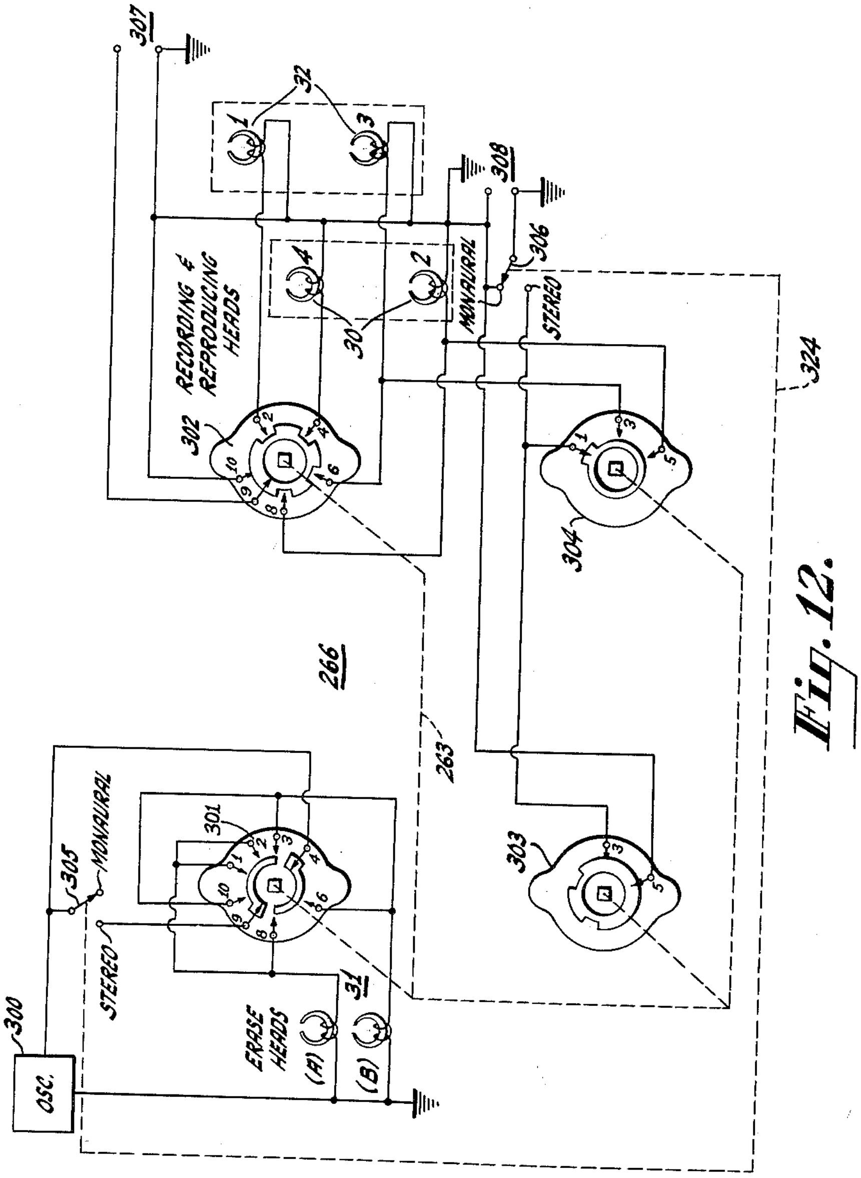
FIGURE 12 is a schematic diagram of other of the electrical apparatus of the equipment shown in the foregoing figures.

Electrical apparatus shown in FIG. 12 provides for selective connection of the magnetic heads 30, 31, and 32 to the electronic equipment associated with the tape transport mechanism provided in accordance with this illustrative embodiment of the invention. Wafer switches 266, having four sections 301, 302, 303, and 304 are mounted on the cam shaft 263 for rotation therewith. Since the shaft 263 is rotated by the step motor in a clockwise sense in steps of seventy-two degrees, the wafer switch sections 301, 302, 303, and 304 will rotate in steps of seventy-two degrees. The wafer switch section 301 controls application of high frequency signal from an oscillator 300 to the pair of cores (A) and (B) of the erase head 31. The oscillator 300 may be of conventional design for generation of oscillation at a frequency a few times higher than the highest audio frequency to be recorded. The oscillator 300 may also be connected by circuits (not shown) to supply high frequency bias signals to the heads 30 and 32 during recording. A stereo-monaural selection switch 305 is connected between the oscillator 300 and the contact pin number 9 of the wafer switch 301.

The shape of the movable contactor on the wafer switch 301 determines which one of the cores (A) or (B) will be supplied with the high frequency oscillations so that it will be operative to erase signals recorded on a selected one of the four tracks on the tape. Track selection occurs because of the action of the wafer switch section 301 and because the erase head 31 is mounted for vertical movements.

The cores of the recording and reproducing head 32 are designated by the reference numerals 1 and 3 which correspond to the tracks 1 and 3 which are sequentially or successively scanned by the head 32 for monaural or stereophonic sound recording, respectively. Similarly the cores of the head 30 are designated by the numerals 2 and 4. Their cores are sequentially connected to the terminal 307 through the wafer switch 302 in order to record or reproduce from the tracks 1 to 4. The wafer switch 302 has a rotatable contactor which is shaped to provide connections between selected contact pins thereof as the contactor undergoes stepwise rotation. The terminal 307 serves as an input terminal on recording and signals to be recorded are supplied thereto. During reproducing operations the terminal 307 is an output terminal. The terminal 307 may be connected to the amplifier and other electronic apparatus which handle signals recorded or to be recorded on the tape record. Another terminal 308 is provided which functions alternatively as input and as an output terminal in a manner similar to terminal 307. For stereophonic recording or reproduction, one sound channel including electronic equipment, is connected to one terminal 307 and another channel, including other electronic equipment is connected to the other terminal 308.

A stereo-monaural switch 306, which may be ganged for operation with the other stereo-monaural switches of the equipment and two wafer switches 303 and 304 determine the connections between the other terminal 308 and the cores 1 to 4 of the heads 30 and 32.

*Operation*

The equipment is shown in FIGS. 5, 6, and 7 in the start position. In this condition, the drive motor 127 is stopped. The coupling disks 50 and 51 are not rotated, since the belts 147 or 148 are not tightened and the idler rollers 156 and 157 are separated from the pucks 154 and 155. The master slide 212 is maintained by the springs 226 in position towards the front of the machine so that the pressure pads 37, 38, and 39 are spaced from the heads 30, 31, and 32. The forked members 229 and 230 are drawn together by their interconnecting spring 233. The forked members are therefore clear of the notches 186 in the pressure roller control arms 185. Thus, the pressure roller control arms 185 are urged toward the front of the machine by their springs 187 which are carried by the arms 182 linked to the control arms 185. It follows that the pressure rollers 28 and 29 will be drawn away from the capstans 35 and 36.

In the start condition, the cam follower portions of the links 199 are on the projections of the release cams 260 and 261. The feeler arms 188 are, therefore, forced towards each other in a direction away from the tape path in the cartridge. The tape path is defined along the deck 21. A clear path complementary to the tape path in the cartridge 60 is provided on the deck 21 when the equipment is in the start condition. This path is free of the various driving and driven elements provided by the apparatus such as the feeler pins 54, 55, the pressure rollers 28 and 29, and the pressure pads 37, 38, and 39. The cartridge 60 may therefore be inserted into operating position on the tape deck 21.

The recording and reproducing equipment may be conditioned for a recording or reproducing operation by merely pressing the start button 23. The electrical switch action of the start push button causes power to be applied to the step motor 267, as is evident from FIG. 11. The cam shaft 263 therefore begins rotation. A detailed description of the operation of the mechanism will be presented at this point, in the interest of clarity of presentation. The operation of the electrical apparatus shown in FIGS. 11 and 12 will be subsequently described and interrelated with the operation of the mechanism to more fully point out the novel features of the electromechanical apparatus provided by the invention.

Figure 8:
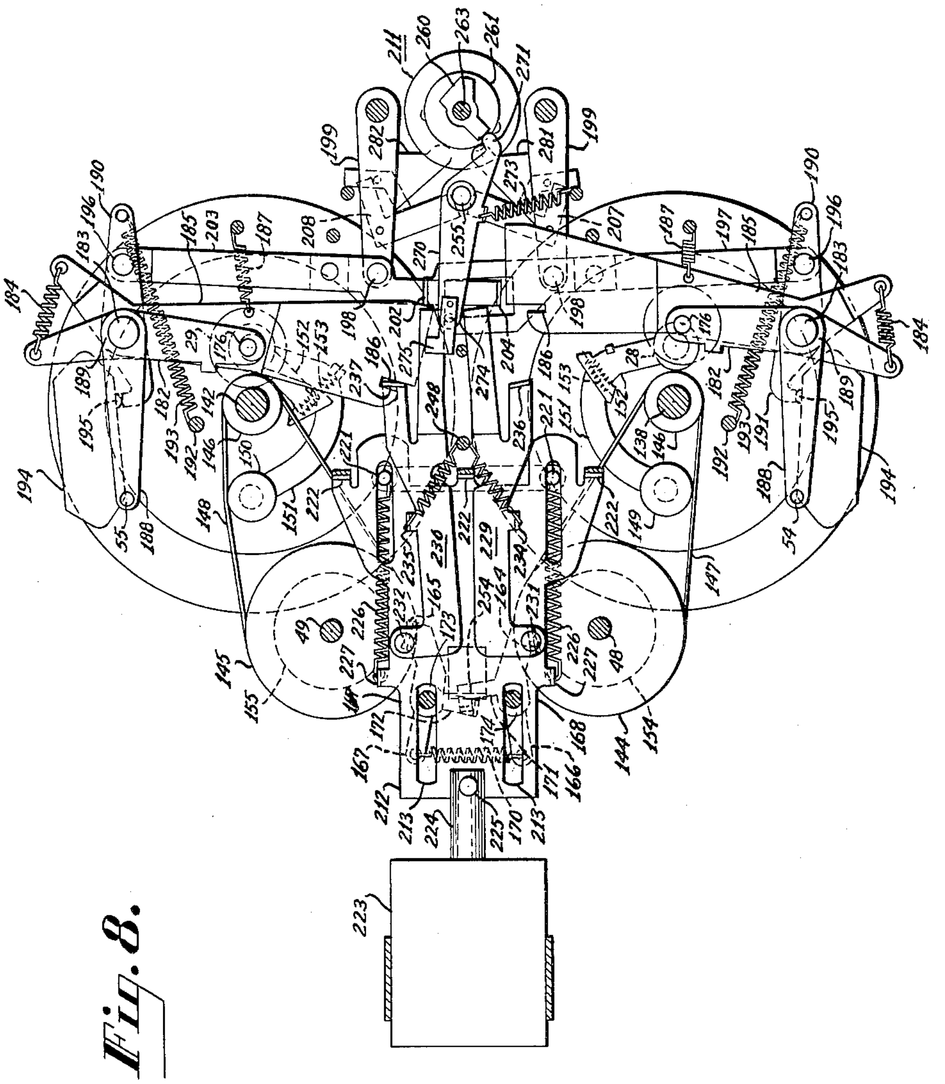
FIGURE 8 is a simplified, sectional view of the equipment shown in FIGURES 1, 2, and 5 to 7 with some of the parts removed showing some of the various elements as disposed during one operating condition of the equipment.

Referring to FIG. 8, portions of the mechanism are illustrated as conditioned for recording or reproducing on the magnetic tape 85. With the mechanism conditioned as shown in FIG. 8, the tape is reeled from the left hub 83 to the right hub 84, the directions being taken with reference to FIG. 2. As soon as the cam shaft begins rotation in a clockwise sense, the release cams 261 and 262 turn so that the projections thereon move off the cam follower arms 281 and 282 of the links 199. The arms 190 which are coupled to the links 199 are therefore permitted to move under the bias of the springs 193 so that their switch contacting portions 191 actuate the switches 194. When the switches 194 are actuated, power will be applied to the drive motor 127. The shafts 138 and 142 which drive the capstans 35 and 36, respectively, will rotate in opposite directions, the shaft 142 and the capstan 36 rotate in a counterclockwise direction, as viewed in FIG. 8. Thus, for example, when the pressure roller 29 is brought into tape pinching relationship with the capstan 36, the tape will be driven from the left to the right, as viewed in FIG. 2.

The pressure roller control arm 185, in cooperation with the master control slide 212, and the pressure roller arm 182, serves to bring the pressure roller 29 into contact with the capstan 36. Movement of the master control cam 260 in a clockwise direction causes the control lever 270 to pivot about its pivot support 255 in a clockwise sense. The pin 274 at the free end of the lever 270 contacts one of the forked members 230 on the master control slide 212 and moves that member 230 about its pivot 232 towards the right. The upstanding projection 237 at the end of one of the prongs of the forked member 230 enters the notch 186 in the pressure roller control arm 185. After a period of time determined by the relative position and speed of rotation of the wafer switches 265, the solenoid 223 is caused to be energized. The armature 224 of the solenoid pulls in and moves the master control slide 212 against the bias of its springs 226 towards the rear of the machine. Since the projection 237 is in the notch 186, the pressure roller control arm 185 pivots about the post 183. Simultaneously, the arm 182 which supports the pressure roller 29 pivots about the post 183. Pivotal forces are transferred between the arm 185 and the arm 182 by way of the spring 184. The spring 184 and the over-centered, angularly disposed portions of the arms 182 and 185, make the pressure roller 29 snap quickly onto the capstan. The tape is then in driving relation with the capstan.

In order to maintain the pressure roller 29 in position against he capstan 36 during the time that the tape 85 is reeled from left to right between from the hub 83 to the hub 84, a latching arrangement is provided, which utilizes the tension responsive mechanism associated with the left tape feeler pin 54.

The tension control arm 197 and the pressure roller control arm 185 latch and maintain the pressure roller 29 in contact with the capstan 36 during the run of tape from left to right. These arms 197 and 185 automatically unlatch at the end of the run from left to right so as to release the pressure roller 29 from the capstan 36 at the end of the run.

The back edge of the notched end of the pressure roller control arm 185 becomes latched against the upstanding projection 202 at the end of the tension control arm 197 of the left tension responsive mechanism. This action is accomplished when the tension control arm 197 is advanced towards the right in response to the bias provided by the spring 193. Thus the pressure roller control arm 185, the forked member 230 and the master control slide 212 are maintained in pulled-in position although the solenoid 223 may have been de-energized.

The left tape feeler pin mechanism is responsive to the tension in the tape near the left hub 83 of the cartridge 60. When the tape 85 is almost completely unwound from around the hub 83, the portion of the tape which rides over the tape feeler pin 54 will be advanced significantly towards the right. The tape tension will increase in that portion thereof which rides on the pin 54 and the pin 54 will be moved along the slot 89 in the cartridge 60 towards the right. In other words, the feeler pin support arm 188 is pivoted in a clockwise direction about the post 183. This will cause the tension control arm 197 to be moved toward the left. This movement of the tension control arm is utilized in accordance with the invention to stop tape reeling operations from left to right when the tape is completely reeled off the left supply hub 83.

The slide 212 and pressure roller control arm 185 are biased for movement towards the front of the machine by reason of the forces applied by the springs 226. It follows that at the end of the run of tape from left to right and the concomitant movement of the tension control arm 197 towards the left, the slide 212 and the pressure roller control arm 185 will be released to resume their normal positions, as shown in FIG. 6. Thus, tape reeling operations from left to right are terminated. It will be noted that the arm 190, which is linked with the tension control arm 197, is moved in a clockwise sense when the arm 197 is caused to release the pressure roller control arm 185. Thus, the hook portion 191 is removed from the switch actuating plunger 195 and the left feeler switch 194 is permitted to resume its normal or de-actuated position. In the de-actuated position, the disposition of the contacts in the switch 194 is reversed. The operation of the switch 194 initiates, in an automatic manner, further rotation of the cam shaft 163, and the further sequence of operations includes pull-in of the solenoid 223, for providing reeling in the opposite direction from left to right.

The actuation of the mechanism to provide tape reeling in the reverse direction from right to left, as viewed in FIG. 2, is illustrated in FIG. 9. After energization of the stepping motor 267, the cam shaft 263 begins rotation of another seventy-two degrees. During the course of such further rotation, the semi-circular projections on the release cams 261 and 262 are brought into engagement with the cam follower portions 281 and 282 of the links 199. As was the case for the tension responsive mechanism shown in FIG. 6, engagement of the projections on the release cams 261 and 262 with the cam followers 281 and 282 causes the tension control arms 197 and 203 to move in opposite directions against the bias of their springs 193. It was pointed out above that the movement of the tension control arm 197 causes the release of the pressure roller control arm 185. Thus the provision of projections on the release cams 261 and 262 insures that the pressure roller mechanism will be released together with the slides 212 so that the normal position of the elements will be restored. In their normal position, the elements are positioned for further actuation.

Movement of the control cam 260 to the position shown in FIG. 9 causes the control lever 270 to pivot about its support post 255 in a counter-clockwise sense. The pin 274 which depends from the free end of the control lever 270 is brought into contact with the other of the forked levers 229. The upstanding projection 236 on one of the prongs of the forked member 229 enters the notch 186 of the pressure roller control arm 185 which controls the pressure roller 28. After an interval of time determined by the relative position of the contact on the wafer switches 265, the solenoid 223 is actuated and pulls the master control slide 212 and the forked member 229 which is associated therewith back to the position shown in FIG. 9. In the course of assuming that withdrawn position, the pressure roller control arm 185 is pivoted in a counter-clockwise sense about the post 183. Force is transmitted from the opposite end of the pressure roller control arm 185 through the spring 184 to the arm 182 which supports the pressure roller 28. Thus, the pressure roller 28 is yieldably urged into pinching contact with the capstan 35. The capstan 35 is now in rotation in a clockwise direction. The tape is then driven from the right hub 82 to the left hub 83 at a speed determined by the speed of rotation of the capstan 35.

The right tension control mechanism operates to latch the slide and the pressure roller control arm in place during the reeling operation from right to left.

Due to the action of the release cams 262 and the spring 193, the linkage provided by the arms 188, 203 and the link 199 is disposed in the position shown in FIG. 9. In that position, the lower edge on the free end of the pressure roller control arm 185 latches with the upstanding projection 204 at the end of the tension control arm 203. When the tension applied to the feeler pin 55 is increased, the tape is almost completely unreeled from the right hub 82. Then, the arm 188 supporting the feeler pin 55 pivots about the post 183 in a counterclockwise sense thereby moving the control arm 203 towards the right and releasing the left pressure roller control arm 185. Upon release of the left pressure control arm 185, the slides 212 and the forked members 229 and 230 associated therewith are restored to their normal position and tape reeling from right to left is terminated.

When the right feeler pin support arm 188 pivots in a counterclockwise sense, the hooked member 191 is removed from the plunger 195 on the right tape feeler switch 194. This de-actuates the switch 194 and electrically initiates the sequence of events for providing tape reeling again in the direction from left to right. To achieve tape reeling from left to right, the mechanism repeats the operations set forth and described in connection with FIG. 8. For subsequent tape reeling from left to right the sequence of operations described in connection with FIG. 9 are again repeated. After automatic tape reeling operations twice in opposite directions for monaural recording and reproduction or once in each direction for stereophonic recording or reproduction, the electrical apparatus of the present invention serves to automatically shut off the machine.

The equipment provided by the present invention also includes mechanisms for rotating the hubs 82 or 83 to wind the tape thereon during the reeling operations. This mechanism will be referred to as the takeup mechanism. The pulley 144 and 145 on the shafts 48 and 49, the belts 147 and 148 and the jockey rollers 149 and 150 serve as the takeup mechanism (see FIG. 8). The belts 147 and 148 are loosely disposed around the pulleys 144 and 146 and the pulleys 145 and 146. No driving forces are transferred between the pulleys until the jockey rollers 149 and 150 are actuated to tighten the belts 147 and 148. Such actuation is provided by the pressure roller control arm 185. For example, as viewed in FIG. 8, when the pressure roller control arm 185, which controls the right pressure roller 29, is pulled back for purposes of advancing the pressure roller 29 into pinching engagement with the capstan 36, the forward edge of the pressure roller control arm 185 abuts against a projection on the end of the arm 152. This arm pivots about its support post 176. The spring 153 which extends between the jockey roller arm 151 and this arm 152 the spring 153 yieldably applies forces to the arm 151 and brings the jockey roller 150 into contact with the belt 148. Thus, when the tape is reeled from left to right by action of the right capstan 36 and the right pressure roller 29 the right hub 82 is rotated to wind tape thereon.

The operation is substantially identical in the case of reeling from right ot left as shown in FIG. 9. There, the left pressure roller control arm 185 abuts against the arm 152 and causes spring forces to be applied to the spring 153 to the other arm 151. This causes the jockey roller 149 to tighten the belt 147. For reeling from right to left the left hub 83 is rotated to wind tape thereon. It is not necessary in the case of the present invention to provide any back tension on the hub which is supplying tape. This is because the construction of the cartridge, and particularly the liners 103 and 104 therein.

The master control slide 212 operates automatically to release the brakes between the different reeling operations. The brake pads 164 and 165 are mounted on levers 166 and 167 which are normally biased into engagement with the high speed drive pucks 154 and 155 on the reel shafts 48 and 49. Control levers are an integral part of these arms 166 and 167. These control levers 171 and 172 are disposed to be engaged by a rectangular stud 154 which depends from the master control slide 212. Thus, when the master control slide 212 is pulled in towards the rear of the machine and latches by means of the tension control arm 197 or 203 the brakes are maintained in released positions. The brakes are automatically applied as soon as the master control slide 212 is disposed again in forward position. Because of the location of the brake arms 166, 167, pads 164, 165 and pivotal axis of the arms 166 and 167, braking forces are regeneratively applied to the hub that is supplying the tape and degeneratively applied to the hub that is taking up the tape.

Pressure pads 37, 38, and 39 which are mounted on arms 40, 41 and 42 are brought into contact with the magnetic heads 30, 31, and 32 during the recording and reproducing operations. The master control slide 212 is provided with upstanding projections 222 near the forward end thereof. These projections are disposed in front of the lower ends of the pressure pad mounting members 40, 41, and 42. These members 40, 41, and 42 are pivoted into contact with the faces of the heads 30, 31, and 32. Spring means, not shown, such as may be hairpin springs wound around the pivotal supports of the members 40, 41, and 42, may be used to normally urge pads toward the heads.

Recording is accomplished by means of the heads 30 and 32. The head 31 is an erase head. Head 32 is operative when the tape is being reeled from left to right as viewed in FIG. 2 to record or reproduce information on a first track 1, disposed near the bottom edge of the tape as viewed in FIG. 2. The bottom edge is most closely adjacent to the tape deck 21. Another core element is provided in the head 32 for recording on another track, which will be designated as track 3, which is spaced from the first track. The head 30 is operative to record and reproduct on one or both of two tracks when the tape is driven from right to left as viewed in FIG. 2. These two tracks are designated herein as a second track, track 2, which is disposed near the top of the tape and a fourth track, track 4, which is interleaved between the first and third tracks. The erase head is also provided with two cores (A) and (B) and may be used alternatively to erase the first and third tracks or the second and fourth tracks. The erase head 31 is mounted on brackets 278 and 279 for vertical movement guided by the posts 276 and 277. Such movement is controlled by the stepped spring member 275 which is near the free end of the control lever 270. When it is desired to record on tracks 1 or 3 or on both tracks 1 and 3 for stereophonic recording with the head 32 the erase head 31 is permitted to remain in lowered position by virtue of a step in the spring 275 at the end of the control lever 270. As shown in FIG. 8, the spring 275 is moved to the right for reeling operations from left to right. During such reeling operations the head 32 is operative to record and the erase head 31 is in lowered position to erase signals recorded on tracks 1 and 3, preliminary to these tracks being recorded on the tape by the head 32. As shown in FIG. 9 the free end of the lever 270 swings the spring 275 to the left during reeling operations from right to left. During such operations the head 30 is operative to record information on either of tracks 2 or 4. It may record on both of the tracks 2 and 4 during stereophonic recording. The pin 280 is raised by the upper step of the L spring 275. This raises the erase head 31 to its upper position wherein the cores thereon are disposed adjacent tracks 2 and 4 for erasing information recorded thereon preliminary to further recording by the head 30.

At this point it will be desirable to consider the operation of switching arrangement for applying signals to the heads and for deriving signals therefrom. This arrangement is shown in FIG. 12.

In the start condition, as shown in the drawing, short contact pin number 1 of wafer switch 301 is connected to coil around core (A) of the erase head 31. Long contact pin 4 is connected to the oscillator 300. When the tape transport mechanism is conditioned for tape reeling from left to right, the erase head 31 is disposed in its lower position and the shaft 263 rotates clockwise in a seventy-two degree step to connect pins number 4 and 1 through the rotatable contactor of the switch 301. Thus, core (A) scans lower track 1 and more (B) scans track 3. The oscillator 300 is connected, during recording, to the coil of core (A) through pins numbers 4 and 1 of the wafer switch 301.

For stereophonic sound recording the switch 305 is switched to its stereo contact and oscillations are applied to the coil of core (B) as well as to the coil of core (A) through pins numbered 9 and 6 of the wafer switch 301. Track 3 on the tape is then erased simultaneously with track 1.

Tape reeling from right to left is accomplished after the cam shaft 263 has rotated another seventy-two degrees in the clockwise sense. Also, the erase head 31 is raised into its upper position wherein core (B) scans track 2 and core (A) scans track 4. For monaural recording, track 2 is recorded after track 1, although these tracks are nearest opposite edges of the tape, in order to minimize crosstalk. Erase energy oscillations are applied to the coil of core (B) to erase track 2 prior to recording. A circuit connects the oscillator 300 and the coil of core (B) through the wafer switch 301 from pin number 4 to pin number 3. When the stereo-monaural switch 305 is actuated oscillations are also applied to the coil of core (A) to erase track 4 prior to recording through the switch 305 and the wafer switch 301 from pin number 9 to pin number 8.

Erase oscillations are supplied to the coil of core (B) of erase head 31 when track 3 is scanned prior to recording thereon through pins numbered 4 and 10 of wafer switch 301. Track 3 is scanned after track 2, in the reverse direction of scanning, after the stepping motor advances another seventy-two degrees.

Track 4 is erased by core (A) which is energized through a circuit including contact pins numbers 4 and 2 of the wafer switch 301.

In the start position shown in FIG. 12, the wafer switch 301 opens the circuits from the oscillator to the erase head and erasure is not possible with the head 31. During reproducing the oscillator 300 is inoperative. It may be energized for operation only during recording by another switching arrangement (not shown), which may be conventional.

In the start position shown in the drawing FIG. 12, none of the cores 1 to 4 of the heads 30 and 32 is connected to either terminal 307 or 308. The terminal 307 is grounded through pins 9 and 10 of the switch 302. The terminal 308 is grounded through the stereo-monaural switch 306. Clockwise rotation of the wafer switch over steps of seventy-two degrees connects the coils of cores 1, 2, 3, and 4 successively to the terminal 307 by connections between long contact pin 9 and one of pins 2, 4, 6, and 8.

When the stereo-monaural switch 306 is in stereo position, the terminal 308 remains grounded through pins numbered 3 and 5 of the wafer switch 303 in the start condition, shown. After the first step of rotation, the switch 303 will be open and the other switch 304 connects the terminal 308 to the core 3 of the head 32, for stereophonic sound recording or reproduction. Similarly, the terminal 308 is connected to core 2 of the other head 30 after the next stepwise rotation of the cam shaft 263 through pins 5 and 1 of the wafer switch 304. The other wafer switch 303 is open during this last mentioned step of rotation. On the third and fourth step of rotation the terminal 308 is grounded through the switch 303, since recording of signals from terminal 308 should not occur during the last two steps of rotation in this illustrative embodiment of the invention. The apparatus automatically returns to start position after bi-directional stereophonic recording and reproduction on all four tracks as will be brought out in greater detail in the discussion in connection with FIG. 11.

The mechanism for providing fast reeling of the tape 85 between the hubs 83 and 84 in the cartridge 60 is shown in FIG. 10. The parts not directly associated with the mechanism are not shown in FIG. 10 for clarity of presentation. The mechanism in FIG. 10 is shown conditioned for fast reeling in the forward direction, that is, from left to right. Therefore, the fast forward push button 24 is depressed. The sector shaped lever 241 is pivoted by action of the push button actuated rod 251 to advance the fast forward slide 239 toward the rear of the machine. The fast forward push button 24 may then be released. The fast forward slide latches in its advanced position. It may be desirable to latch the push button 24 for the fast forward control as well as the stop and reverse push button 25 and 26 in down position by any detent mechanism of a conventional type. This will open the switches associated with the push buttons 24, 25 and 26 and prevent automatic operations, so long as neither the start 23 or resume 27 button are pressed.

The left tape tension responsive mechanism provides the latching action. It will be remembered that this mechanism includes the left tape feeler pin 54. The pin 54 is mounted on one end of crank arm 188 which is pivotally mounted on the left side post 183. The control arm 197 is connected to the opposite arm 190 of the crank 1 and is urged toward the fast forward slide 239 by the action of the spring 193. The arm 197 is permitted to move towards the slide 239 since the cam follower arm 281 of the link 199 is not on the projection of the release cam 261.

The projection 201 at the bifurcated end of the tension responsive control arm 197 is engaged by the lateral extension 242 on the fast forward slide and latches therewith. Such latching engagement is retained until the tape is completely unreeled from the left hub 83 and the tension on the feeler pin 54 increases to an extent causing the control arm 197 to be retracted to the left. It follows that the fast forward slide 239 will be unlatched. The slide moves forwardly under the force applied by the spring 245 into its initial position.

The mechanism is simultaneously set to resume automatic tape reeling operations, for example, scanning the next selected record track on the tape. This is because the left tape feeler switch is actuated and initiates the next scheduled sequence of operation of the step motor 267, solenoid 223 and the mechanism associated therewith, as has been heretofore described. Thus, for example, if the fast forward push button 24 is depressed during the scanning from left to right of track 1, reeling from left to right will be quickly completed. After the fast reeling operation, scanning of track 2 will be automatically initiated.

When the fast forward reeling mechanism is conditioned for operation, the brake actuating extension 314 on the fast forward slide 239 pivots the levers 171 and 172 on the bell crank brake arms 166, 167 to pivot the brake pads 164 and 165, against the bias of the spring 170, out of engagement with the high speed drive pucks 154 and 155. The brakes remain released due to the latching arrangement. The idler roller 157 is permitted to move under forces applied by the spring 163 into coupling engagement with the fast forward drive puck 155 and the capstan flywheel 143. This is because the upstanding projection 316 at the back end of the fast forward slide is moved away from the downwardly extending projection 320 at the end of the idler roller arm 159. Thus, the hub shaft 49 and the hub 84 is driven for high speed tape take-up.

The reverse slide 238 may be advanced when fast tape reeling from right to left is desired. The fast reverse reeling operation is substantially identical to the fast forward reeling operation. Therefore, the fast reverse reeling operation will not be set forth in detail.

When the stop slide 246 is advanced toward the rear of the machine, the stud 255 pushes simultaneously against both the angle projections 207 and 208 on the links 199. The motion of the links 199 is transferred to the control arms 197 and 203 thereby unlatching whichever one of the arms 197 and 203 is disposed in latching engagement with a slide at the time.

Movement of the fast forward slide into the advanced position shown in FIG. 10 causes the angle member 259 to abut against the stop 209 and pivot into the path of the rectangular stud 257 on the stop slide 246. Thus, when the stop push button 25 is released and the stop slide 246 moves back under the force applied by the spring 249, the rectangular stud 257 engages to angle member 259 and retracts the fast forward slide 239. This insures rapid action of the mechanism.

The operation of the electrical equipment used in conjunction with the mechanism which has been described will be best understood by reference to FIG. 11. This electrical equipment, in combination with the mechanisms, provides for automatic, continuous stereophonic or monaural sound recording and reproduction on the tape, and causes the equipment to shut off after recording or reproduction on all tracks is completed. A further feature is that the equipment may be stopped at any time during any recording or reproducing operation. Operations may thereafter be resumed to permit editing.

In order to condition the equipment for recording and reproduction on any record track, the sequence of switching operations takes place under the control of the wafer switches 265. Each of the switches 283, 284, and 285 has a rotary contactor and a series of contact pins numbered one to ten (1 to 10) and disposed circumferentially around the rotary contactor. Each rotary contactor is of different shape in that the sizes and initial positions of the enlarged portions thereof may be different, as shown in the drawing. Thus, the rotary contactors of the switches are operative to make contact with different ones of the contact pins at different times to provide a sequence of controlled electro-mechanical operations.

The drawing shows the circuit in the start position. Hence, the drive motor 127 is not energized, as no connection is made therefrom to the power line terminals 12 and 14. The tape feeler switches 194 are in their forward positions to permit cartridge loading. The solenoid 223 and the step motor 267 are also deenergized.

After a cartridge 60 is inserted, the start push button 23 is depressed to close the start switch 23. Power is applied to the step motor 267 through a circuit between the line terminals 12 and 14 including the start push button switch 23, the step motor 267, and the fast forward, stop and reverse push button switches 24, 25, 26. As soon as the step motor 267 begins rotating its holding switch 287 closes and the cam shaft 263 turns. Contact pins 1 and 4 of the first wafer switch 283 are connected, immediately upon rotation of the cam shaft 263 and connecting the terminal 286 of the stepping motor 267, to the line terminal 12 by way of a circuit which includes the holding switch 287, the pins 1 and 4 and the rotary contactor of the first wafer switch 283. Thus, if the start push button 23 is prematurely released and its switch opens, the step motor 267 rotates for a full 72° until the rotary contactor of wafers switch 283 becomes disconnected from pin 1. The construction of the step motor is such that the armature thereof drops out of engagement with the gearing of the motor as soon as the power to the motor is terminated. The drag of the gearing and cam shaft 263 coupled thereto is so large that the slowly turning shaft 263 stops almost immediately. The step motor 267 is commercially available. Its construction therefore will not be discussed in detail herein.

The drive motor 127 is energized by power from the line terminals 12 and 14. The line terminal 14 is directly connected to the drive motor terminal 293. The other drive motor terminal 294 is connected to the line terminal 12 through the feeler switches 194, which are connected in parallel between the line and motor terminals 12 and 294.

Further rotation of the step motor 267 causes the control lever 270, which follows the control cam 260, to rotate in a clockwise sense as viewed in FIG. 8 so that one of the forked members 230 on the master control slide 212 is pivoted to the right to become interengaged with the right pressure roller control arm 185. The rotatable contacts of the second and third wafer switches 284 and 285 are disposed so that they provide connections between the pins numbered 1 and 8 and the pins numbered 1 and 10, respectively, after the forked member 230 and the right pressure roller control arm 185 are engaged. Pre-setting the rotatable contactors of the switches 284 and 285 so that they make the aforesaid connections after about 65° of cam shaft 263 rotation will be suitable. The solenoid 223 is therefore energized by application of alternating current voltage to its rectifier 290. The solenoid operating circuit extends between the line terminals 12 and 14 and includes the reverse, stop, and fast forward switches 26, 25, and 24; the rectifier 290; the second wafer switch 284, through its pins 8 and 1; the third wafer switch 285, through its pins 1 and 10;

the holding switch 287 of the rotating step motor 267; and the first wafer switch 283 through pins 1 and 4 or alternately through the feeler switches 194. The solenoid, therefore, pulls in and mechanism latches by reason of the disposition of the tension control arm 197 and the pressure roller control arm 185. The latch arrangement is schematically designated at 325 in FIG. 11.

After the mechanism is latched in position the first wafer switch 283 and the second wafer switch 284 will have caused the circuit to the step motor 267 and rectifier 290 to open whereby they will be deenergized while the tape is transported from left to right and the first record track is scanned for recording or reproduction thereon.

It will be noted that an alternative circuit for energizing the step motor 267 is provided which insures that the step motor will continue rotation unless the mechanism is latched in position. This prevents inopportune recording or reproducing operations, without the various heads and rollers in proper position, so as to eliminate spoiling the tape. The alternate circuit extends from the terminal 286 of the step motor; through the holding contacts 287; the back contacts 288 of the solenoid 223; and the feeler switches 194 to the line terminal 12. Thus the step motor remains energized if the solenoid does not latch into pulled-in position to permanently open its back contacts 288, even though the connections through the first wafer switch 283 are broken.

After tape reeling from left to right the tape becomes exhausted on the left hub 83 of the cartridge 60. The tape moves to the right in the region between the hub 83 and the guides 91. The tension in the tape also increases. The combination of these effects causes force to be exerted on the left tape feeler pin 54 so that the pin and the arms linked therewith move. The left tape feeler switch 194 is actuated to initial position shown in the drawing and the tension control arm unlatches and releases the pressure roller 29, pads 37, 38 and 39, and master control slide 212.

The step motor 267 is actuated to begin another 72° of clockwise rotation. The energizing circuit, between the line terminal 14 and the motor terminal 295 is through the reverse, fast forward and stop switches 26, 24, and 25, as before. The motor terminal 286 is connected through the pins 10 and 1 of the third wafer switch 285, which remain connected after the run of tape from left to right; the left tape feeler switch 194, which is disposed in switched position; to the line terminal 12.

The first wafer switch provides a connection between pins 3 and 4. Thus, providing, with the holding contacts 287 of the step motor 267, an alternate connection from the power line terminal 12 to the step motor terminal 286. Such connection is desirable since the release cams 261 and 262 move the tension control arms 197 and 203. This may cause a temporary disconnection of power to the step motor due to actuation of the right tape feeler switch 194 in the motor power circuit.

The control lever 270 is rotated in a counterclockwise sense and accomplishes the two fold operation of (*a*) effecting engagement of the forked member 229 with the left pressure roller control arm 185 and (*b*) raising the erase head 31 so that its cores are disposed to cooperate with tracks 2 and 4.

After the period of time required for connection to be established between pins 3 and 8 of the second wafer switch 284 and pins 2 and 3 of the third wafer switch 285, the rectifier 290 is energized by application of voltage thereto over a circuit from terminal 12; through first wafer switch 283 pins 4 and 3; the holding contacts 287; the third wafer switch 285 pins 2 and 3; and the second wafer switch 284 pins 3 and 8 to the rectifier 290. The line terminal 14 is connected to the rectifier through the push button switches 24, 25, 26. The solenoid 223 is therefore energized and pulls in. The mechanism schematically shown at 325 and in detail in FIG. 9 becomes latched in position for tape transport from right to left as viewed in FIG. 2. The solenoid 223 is deenergized due to the disconnection of the pins 3 and 4 in the first wafer switch 283 and pins 3 and 8 in the second wafer switch 284, after these switches have rotated through 144°.

After a run of tape from right to left the tape around the right hub 84 becomes exhausted so as to increase the tension in the portion of the tape near the right tape feeler pin 55. The consequent movement of the pin 55 and the right tension responsive mechanism associated therewith causes the right tape feeler switch 194 to be switched back to its initial position which is shown on the drawing. The slides and left pressure roller mechanism become unlatched upon movement of the right tension responsive mechanism. The step motor 267 is again energized through a circuit from the line terminal 14, including the pushbutton on switches 24, 25, and 26, the step motor 267, the third wafer switch 285 pins 2 and 3; the right tape feeler switch 194; and the right tape feeler switch 194 (which is disposed in switched position) to the other line terminal 12.

After further rotation of the step motor 267, the control lever 270 again turns in the clockwise direction due to the action of the control cam 260. The right forked member 230 engages the right pressure roller control arm 185 as shown in FIG. 8. The rotation of the second and third wafer switches 284 and 285 effects connections between pins 5 and 8 of the second wafer switch 284 and pins 4 and 5 of the third wafer switch 285. Thus, the solenoid 223 is energized to pull-in by application of alternating current voltage to the rectifier 290 through a circuit between the line terminals 12 and 14 including the pushbutton switches 24, 25, and 26; the rectifier 290; the second wafer switch 284 pins 8 and 5; the third wafer switch 285 pins 4 and 5; the monaural-stereo switch 292, the holding contacts 287; and the first wafer switch 283 pins 5 and 4. The mechanism latches as heretofore explained and the power to the solenoid 223 and step motor 267 is cut off due to disconnection in the first and second wafer switches 283 and 284. The tape is then reeled from left to right to permit scanning of the third record track on the tape.

At the end of the run of tape from left to right the same general sequence of switching operations as was the case for conditioning of the tape transport mechanism for tape reeling from left to right takes place in order to scan the record tracks 3 and 4. Since these further operations will be apparent from the above discussion, although connections through different pins of the wafer switches are established, they will not now be set forth in detail.

It will be observed that the brakes 164 and 168 are applied when the master control slide 212 is released. Therefore, reeling is stopped while the mechanism is being conditioned for recording or reproduction on different ones of the successive tracks.

For stereophonic sound recording and reproduction the stereo monaural switches 291, 292, 305, 306 are switched into stereo position. The operation of the equipment is the same as set forth above for conditioning the transport for tape reeling from left to right and thereafter for tape reeling from right to left. However, when the tape is exhausted on the right hub 84, a different sequence of operations occur.

The step motor 267 is energized upon actuation of the right tape feeler switch in response to an increase of tension in the tape at the right tape feeler 55. The step motor energization circuit includes the feeler switches 194 and the third wafer switch 285, as explained above.

As the step motor 267 begins to turn, contact is made between pins numbered 4 and 5 of the first wafer switch. Therefore, the step motor is energized through a circuit from one of its terminals 286; through the holding switch 287, and the pins 4 and 5 of the first wafer switch to the line terminal 12. The other line terminal 14 is connected to the other step motor terminal 295 through the push button switches 24, 25, and 26, as heretofore. The step motor, however, will remain energized until the switches and mechanism return to their initial or start position, shown in the drawing FIG. 11, because the circuit between the step motor terminal 286 and the line terminal 12 is continually reestablished. As the step motor rotates its energization circuit is first reestablished through the pin numbered 6 of the first wafer switch 283 and the monaural-stereo switch 291. The circuit is then reestablished through contact pin 7. Thereafter, the step motor energization circuit is reestablished through the contact pin 8 of the first wafer switch 283 and the stereo-monaural switch 291. Finally, the circuit is reestablished through the contact pin numbered 9. The first wafer switch disconnects the step motor after its rotatable contactor leaves the pin numbered 9, thereby returning the switch to its initial position. When the step motor returns to initial or start position, the feeler switches will be reset to the position shown in the drawing, FIG. 11, due to the action of the control cam and the tension responsive mechanism. In the initial or start position the power line terminals are disconnected from the drive motor 127 and the equipment stops.

The other stereo-monaural switch 292 prevents operation of the solenoid by opening the circuits to the rectifier 290, when disposed in stereo position.

The reverse, stop, and fast forward push button switches 24, 25, and 26 are in series with one terminal of the step motor 267 and rectifier 290 as explained above. Thus upon actuation of any of the push buttons, power is cut-off to the step motor and rectifier thereby preventing operation of these units. The slides are also unlatched when any of buttons 24, 25 and 26 are depressed and are restored, by spring action, to their initial positions. The drive motor circuits remain established, however, so that the equipment immediately assumes a stopped, standby condition. If either the reverse or fast forward buttons are depressed, fast reeling operation is established. It may be desirable to incorporate further switches which operate with the power control switches 24, 25, and 26 shown in FIG. 11 to suitably switch the electronic circuits associated with the tape transport mechanism provided by the invention to an inoperative or standby condition when buttons 24, 25 or 26 are depressed.

What is claimed is:

1. Mechanism for transporting an elongated flexible medium comprising means including a first member for effecting movement of said medium, means including a second member for sensing the tension in said medium, said second member being disposed in latching engagement with said first member when said first-named means is disposed for effecting movement of said medium, and means also included in said tension sensing means for shifting said second member out of latching engagement with said first member.

2. Mechanism for transporting an elongated medium comprising means for driving said medium, control linkage means operatively coupled to said driving means for placing said driving means in driving relationship with said medium, said control linkage means including a latching mechanism engageable with said driving means upon placement of said driving means into driving relationship with said medium for maintaining said driving means disposed in driving relationship with said medium, and means responsive to a condition of said medium for releasing said latching mechanism from maintaining said driving means in driving relationship with said medium.

3. Mechanism for transporting an elongated medium along a path comprising a member for driving said medium, disengageable means for carrying said driving member into driving relationship with said medium, said disengageable means including a lever pivotally mounted for movement in opposite directions, said lever being pivoted in one direction to condition said disengageable means to carry said drive member into driving relationship with said medium, said lever being biased for pivotal movement in the opposite direction, an arm displaceable across the path of movement of said lever into engagement therewith to block pivotal movement of said lever under its bias in said opposite direction, and mechanism responsive to a condition in said medium coupled to said arm for displacing said arm in a direction to disengage said lever.

4. Mechanism for handling a reelable medium which is adapted to travel along a path comprising a member for engaging said medium, means mounting said member for displacement in accordance with movement of said path of travel, means for driving said medium when disposed in driving relationship therewith, said driving means including a control member engageable with said displaceable member to maintain said driving means disposed in driving relationship with said medium and disengageable from said member upon displacement thereof.

5. Mechanism for transporting a flexible tape along a path between a pair of reeling devices comprising tape driving means, a displaceable member for conditioning said driving means into operation to drive said tape when said member is displaced, tape tension responsive means including a plurality of linked arms moveable in response to tension in said tape, a first of said arms contacting said tape, and control means for displacing said member into latching engagement with a second of said arms of said tension responsive means, said second arm being movable with said first arm and away from said displaceable member and out of engagement therewith in response to increased tension in said tape.

6. Mechanism for transporting a tape medium along a path comprising a roller adapted to be moved into tape driving relationship, means including a lever for positioning said roller in tape driving relationship, a displaceable member, said lever being movable with said member for positioning said roller into tape driving relationship, and a pair of conjointly movable arms, one of said arms being biased towards said path for movement into contact with said tape, the other of said arms being biased for movement towards one of said lever and said member to provide latch engagement therewith, and said arms being movable against their bias in response to tape tension whereby to disengage said latch engagement.

7. Mechanism for transporting a tape medium along a path between a pair of reeling devices comprising a tape drive roller disposed on one side of said path, another roller disposed on the opposite side of said path and relatively movable with respect to said drive roller to engage said tape in driving realtionship therebetween, means including a lever for moving one of said rollers into said tape driving relationship, means for latching said lever when said lever moves said one of said rollers into said tape driving relationship and for contacting said tape and releasing said lever in response to excessive tension in said tape, a displaceable slide engageable with said lever, and control means for displacing said slide to move said lever into latching engagement with said latching means.

8. Mechanism for transporting a flexible elongated medium along a path in one direction and in a direction opposite thereto comprising means for driving said medium in said one direction, means for driving said medium in said opposite direction, a pair of members each individual to a separate one of said driving means for conditioning said driving means for operation when moved to predetermined positions, a displaceable member alternatively engageable with one and the other of said pair of members in said driving means, control means for displacing said displaceable member upon engagement thereof with one of said pair of members in said driving means for movement thereof into said predetermined position to provide drive in a selected one of said opposite directions, means including at least one arm disposed for latching engagement with one of said members in said driving means upon movement thereof into said predetermined position, and means responsive to tension in said medium for moving said arm to disengage said latching relation upon increase of tension in said medium along said path.

9. A tape transport mechanism comprising a pair of capstans rotatable in opposite directions and spaced from each other along a path of tape travel between a pair of reeling devices, a pair of pressure rollers disposed on the opposite sides of said path for cooperation with different ones of said capstans, a first lever, a second lever having an end opposed to an end of said first lever to define a space therebetween, each of said levers being coupled to a different one of said pressure rollers for carrying said pressure rollers into tape driving engagement with said capstans when pivoted over a predetermined distance, a first linkage having a pair of arms, second linkage having a pair of arms, one arm of said first linkage having an end extending across said space for latching engagement with said first lever when said first lever is pivoted over said predetermined distance, one arm of said second linkage having an end extending across said space for latching engagement with said second lever, when said second lever is pivoted over said predetermined distance, the other arm of said first linkage being disposed for engagement with said tape along the portion of said path between one of said capstans and one of said reeling devices, the other arms of said second linkage being disposed for engagement with said tape along the portion of said path between the other of said capstans and the other of said reeling devices, and control means including a member slidable through said space and pivotal into engagement with a selected one of said first and second levers for pivoting the selected one of said levers over said predetermined distance into latching engagement with said one arm of one of said linkages and for bringing one of said pressure rollers into driving engagement with said tape, said linkages being operative to release said latching engagement when tape is exhausted from the one of said reeling devices which is supplying tape.

10. Mechanism for handling an elongated medium comprising a capstan, a pressure roller disposed opposite to said capstan for engaging said medium in driving relationship, a lever arrangement for carrying said pressure roller including an arm pivotal in one direction for advancing said pressure roller into engagement with said capstan, a slide member positioned adjacent said arm and slidable in said one direction, at least a portion of said slide member being supported for pivotal movement into linking engagement with said arm, and control means for effecting pivotal movement of said portion of said slide member and sliding movement of said entire slide member in said one direction to bring said capstan and said pressure roller into engagement.

11. In a mechanism for reeling an elongated medium between a pair of reeling devices which includes a reel pulley coupled to at least one of said reels another pulley, a belt loosely disposed around said reel pulley and said other pulley, a roller, and means supporting said roller and movable in one direction to bring said roller into engagement with said belt to tighten said belt thereby coupling said pulleys in driving relationship, the improvement comprising a lever arm pivotal in said one direction into engagement with said roller supporting means, a member positioned adjacent said arm and slidable in said one direction, means on said slidable member for selectively linking said slidable member with said arm, and control means for effecting operation of said linking means on said slidable member and movement of said slidable member in said one direction to pivot said arm into engagement with said roller support means to tighten said belt for reeling of said medium.

12. In a mechanism for reeling an elongated medium along a path between a pair of reels which includes a capstan and a pressure roller disposed on opposite sides of said path for engaging said medium therebetween to drive said medium from one of said reels to the other, a reel pulley coupled to said other reel, a capstan pulley coupled to said capstan, a belt loosely disposed around said reel pulley and said capstan pulley, a jockey roller for tightening said belt to couple said pulleys in driving relationship and jockey roller support means including an arm movable to advance said jockey roller into engagement with said belt to tighten said belt, the improvement comprising a lever arrangement for carrying said pressure roller, said lever arrangement including a lever arm pivotal in one direction to bring said pressure roller into engagement with said capstan, said lever arm being adjacent to said jockey roller arm at one edge thereof for engagement with said jockey roller arm upon pivotal movement in said one direction, a member slidably disposed adjacent said lever arm and engageable therewith, said slidable member being movable in said one direction, and control means for effecting engagement of said slidable member and said lever arm with each other and for effecting movement of said slidable member in said one direction to pivot said lever arm in said one direction for engaging said jockey roller arm thereby bringing said capstan and pressure roller into engagement and said pulleys into driving relationships.

13. In apparatus for reeling an elongated medium having a pair of reeling devices, a driven shaft, a pulley coupled to said reeling device, another pulley coupled to said shaft, and a loose belt looped around said pulleys and a jockey roller disposed adjacent said belt for tightening said belt, the improvement comprising a first arm carrying said roller pivotally mounted for movement toward said belt, a second pivotally mounted arm, a yieldable member coupling said arms for conjoint movement, and a lever arrangement including a lever arm having an edge disposed adjacent to said second arm, said lever arm being pivotally movable into edge engagement with said second arm to yieldably urge said roller into tightening relationship with said belt.

14. The invention in apparatus for reeling an elongated medium as set forth in claim 13, wherein said jockey roller is disposed between said pulleys within the loop of said belt, and wherein said first arm is pivotal towards that portion of said belt which is adapted to be driven away from said pulley on said driven shaft.

15. In magnetic recording apparatus having a pair of rollers relatively movable towards each other to engage a magnetic tape record for transporting said tape along a path, a magnetic head disposed on one side of said path, a member for urging said tape into contact with said head and a support for said member pivotally mounted for movement of said member into contact with said head, the improvement comprising a lever arrangement for carrying one of said rollers, said arrangement including an arm pivotal in one direction to bring said one roller into engagement with the other of said rollers, a member disposed adjacent said arm and slidable in said one direction, means on said slidable member for engaging said support when said slidable member is slid in said one direction for pivoting said support to bring said tape into contact with said head, means on one of said slidable member and said arm selectively engageable with the other, and control means for effecting operation of said last named means and movement of said slidable means in said one direction.

16. In magnetic recording apparatus which includes a capstan and a pressure roller for driving a magnetic tape record along a path, a magnetic head disposed on one side of said path, a pressure pad for resiliently urging said tape into contact with said head disposed on the opposite side of said path and a member supporting said pad mounted for pivotal movement toward said head about an axis parallel to said tape path, the improvement comprising a lever arrangement for carrying said pressure roller including an arm pivotal in one direction to bring said roller toward said capstan, a slidable member having at least a portion which is pivotally mounted for movement toward said arm and disposed adjacent thereto, said slidable member being movable in said one direction, a projection extending from said slidable member for engaging said pad supporting member for pivoting said member about said axis toward said head, another projection extending from said portion of slidable member and engageable with said arm when pivoted thereto, and control means for pivoting said portion and sliding said slidable member in said one direction.

17. Mechanism for selectively transporting an elongated medium in opposite directions along a path of travel comprising a first pair of rollers disposed on opposite sides of said path for driving said medium in one direction, a second pair of rollers spaced along said path from said first pair of rollers for driving said medium in the opposite direction, a first lever arrangement for carrying one of said first pair of rollers, a second lever arrangement for carrying one of said second pair of rollers, a first lever arm in said first arrangement pivotally movable in a predetermined direction for bringing said first pair of rollers into engagement for driving said medium, a second lever arm in said second arrangement pivotably movable in a predetermined direction for bringing said second pair of rollers into engagement for driving said medium, a slidable member having at least a portion thereof disposed between said first and said second lever arms, said slidable member being slidable in said predetermined direction, means on said portion operative to engage a selected one of said first and second lever arms, and control means for effecting operation of said last named means and sliding of said slidable member in said predetermined direction.

18. Mechanism for transporting an elongated tape member along a path comprising a capstan and pressure roller disposed on opposite sides of said path, a first lever carrying said pressure roller, said first lever being mounted for pivotal movement about an axis, a second lever pivotally mounted for movement about said axis, said levers each having ends angularly disposed with repsect to each other which extend beyond said axis, a spring coupling said angularly disposed ends to each other, end of said second lever opposite to said spring coupled end having a notch therein, said second lever being pivotably movable in a predetermined direction to bring said pressure roller into engagement with said capstan, a slide supported for movement in said predetermined direction, said slide being disposed adjacent said end of said second lever opposite said spring coupled end thereof, another member pivotably supported on said slide for movement therewith, said other member having a projection at the end thereof engageable within said notch, and control means for pivoting said other member on said slide to bring said projection into engagement with said slot and effecting movement of said slide in said predetermined direction.

19. Mechanism for transporting an elongated medium along a path comprising means for driving said medium including a driving element normally positioned out of driving relationship with said medium and movable in a predetermined direction into driving relationship therewith, a lever coupled to said element pivotal in said predetermined direction for advancing said driving element into driving relationship, a control member mounted for movement in said predetermined direction having at least a portion thereof mounted for movement in a direction traversely oriented with respect to said predetermined direction towards an end of said lever for engagement therewith, and a cam operatively coupled to said portion of said control member for selectively moving said portion into engagement with said lever, and control means for moving said member in said predetermined direction.

20. Mechanism for transporting an elongated medium along a path comprising first means for driving said medium in one direction along said path including a first drive element movable in a predetermined direction to condition said first driving means for driving said medium, second means for driving said medium along said path in a direction opposite to said one direction including a second drive element movable in a predetermined direction to condition said second driving means for driving said medium, a first lever pivotally movable in said predetermined direction for carrying said first element in said predetermined direction, a second lever spaced from said first lever and pivotally movable in said predetermined direction for carrying said second element in said predetermined direction, a member movable in said predetermined direction having at least a portion disposed between said levers, said portion being movable in opposite directions into engagement with a selected one of said first and second levers, a cam operatively coupled to said portion having a surface shaped for alternatively moving said portion into engagement with said selected one of said first lever and said second lever, and control means for moving said member in said predetermined direction upon engagement of said portion with the selected one of said first and second levers to pivot the selected lever and advance the one of said elements carried thereby in said predetermined direction to condition one of said driving means for driving said medium.

21. Mechanism for transporting an elongated tape medium along a path comprising a first capstan, a second capstan spaced along said path from said first capstan, means for rotating said capstans in opposite directions, first and second pressure rollers cooperative respectively with said first and second capstans, a pair of lever arrangements for carrying different ones of said pressure rollers into engagement with different ones of said capstans, said arrangements including lever arms spaced from each other and pivotally supported for movement in a predetermined direction about different axes to bring said pressure rollers into engagement with said capstans upon movement thereof in said predetermined direction, a slide moveable in said predetermined direction, a pair of members on said slide and movable therewith, one end of each of said members being pivotably secured to said slide, the opposite end of each of said members being disposed in side by side relationship between said lever arms, a rotatable cam, a cam follower arm disposed between said opposite ends of said members and the surface of said cam, said follower arm being pivotably mounted for movement in opposite directions with rotation of said cam for pivoting different one of said members towards different ones of said lever arms and into engagement therewith, and control means for successively rotating said cam and moving said slide in said predetermined direction.

22. Mechanism for use with an elongated medium comprising a drive member, means for carrying said drive member into driving relationship with said medium for transporting said medium along a path, said last-named means including a lever pivotal in one direction to effect said driving relationship and biased for pivotal movement in an opposite direction, an arm displaceable across the path of movement of said lever into engagement therewith to prevent pivotal movement of said lever under its bias in said opposite direction when said lever is pivoted in said one direction, and means for stopping transportation of said medium including mechanism linked with said displaceable arm for displacing said arm in a direction to disengage said lever.

23. Mechanism for transporting an elongated medium comprising means for driving said medium along a path, said driving means including a member biased in one direction and movable in an opposite direction to condition said driving means for operation, a linkage having a plurality of arms, one of said arms being linked between others of said arms for movement transversely to the direction of movement of said member, means biasing said one arm for movement toward said member into latching engagement therewith when said member is moved a predetermined distance in said one direction to maintain said driving means conditioned for operation, and stop means engageable with one of said other arms of said linkage for urging said linkage for movement against its bias to move said one arm out of latching engagement and to release said member for biased movement in said one direction.

24. Apparatus for running a tape medium in opposite directions along a path comprising one pair of disengageable mechanisms each providing driving of said tape in opposite directions, said mechanisms comprising a pair of arms pivotally supported near one of the ends thereof and having the opposite ends thereof spaced from each other, means operative for driving said tape upon pivotal movement in one direction of one of said pair of arms in a given direction and for driving said tape in an opposite direction upon pivotal movement of the other of said pair of arms in said given direction, a pair of linkages each having different control links spaced from different ones of said arms with a link end disposed adjacent to one of said oppositely spaced arm ends, said linkages each also including another pair of links, said control link of each of said linkages being supported between one of said other pair of links for displacement toward and away from one of said arm ends adjacent thereto, and control means for selectively and successively displacing different ones of said arms and said control links for engaging and disengaging said arms.

25. In apparatus for reeling a tape medium in opposite directions along a path between a pair of reeling devices, the improvement comprising a first slide, a second slide spaced from said first slide, means responsive to the advancement of said first slide in a given direction for effecting operation of one of said reeling devices for rotation to wind said tape thereon, means responsive to the advancement of said second slide in said given direction for effecting operation of the other of said reeling devices for rotation to wind said tape thereon, a first linkage and a second linkage, a control link in said first linkage supported for displacement towards and away from said first slide, another control link in said second linkage supported for displacement towards and away from said second slide, spring means for biasing said linkages for displacement of said control links towards said slides, latching means on each of said slides cooperable with said control links when said slides are advanced in said given direction, first means operatively coupling said first linkage to said tape in the portion of said path adjacent one of said reeling devices, and second means operatively coupling said second linkage to said tape in the portion of said path adjacent said other reeling device, said last two named means being operative for displacing said control links in a direction away from said slides to disengage said slides and said control links from latched relationship in response to tension in said tape.

26. In apparatus for reeling a tape medium in opposite directions along a path between a pair of reeling devices which includes a pair of shafts for carrying said reeling devices, another pair of drive shafts driven in opposite directions, a first coupling means movable between one of said shafts carrying said reeling devices and one of said drive shafts coupling said one shafts to each other for driving said reeling device to wind said tape thereon and second coupling means moveable between said other drive shaft and said shaft carrying the other of said reeling device coupling shafts to each other for driving said other reeling device in a direction to wind said tape thereon, the improvement comprising a first slide, a second slide, said first slide being operatively coupled to said first coupling means for moving said first coupling means in coupled relationship with said one shafts when advanced in a given direction, said second slide being operatively coupled to said second coupling means for moving said second coupling means in coupled relationship with said other shafts when advanced in said given direction, a first linkage and a second linkage, said first linkage including a central control link, said second linkage including a central control link, means biasing said linkages for displacement of said control links in directions transverse to said given direction towards different ones of said slides, latching means of each of said slides being engageable with said control links when said slides are advanced in said given direction, an end link in said first linkage being disposed in contact with said tape adjacent one of said reeling devices, and an end link in said second linkage being disposed in contact with said tape near said other reeling device, said end links being operative to displace said linkages upon movement of said tape in a direction transverse to said path whereby to disengage said control links from latched engagement with said slides.

27. In mechanism for transporting an elongated tape along a path between a pair of reeling devices which includes a pair of rollers relatively movable towards each other for engaging said tape and driving said tape along said path at a given speed, the improvement comprising means including a lever pivotal in a predetermined direction for carrying one of said rollers into engagement with the other of said rollers, means responsive to the tension in said tape along said path including an arm, said arm being biased for movement in a direction transverse to said predetermined direction into latching engagement with said lever when said lever is pivoted in said predetermined direction, means for driving one of said reeling devices in a direction to wind said tape thereon for reeling said tape along said path at a speed greater than said given speed when conditioned for operation, a member operatively coupled to said reel driving means displaceable in said predetermined direction for conditioning said reel driving means for operation, another member movable in said predetermined direction, means projecting from said other member for engaging said arm to release said arm from latching engagement with said lever when said other member is moved in said predetermined direction, and means on said first named member for engaging said other member to advance said other member in said predetermined direction when said first named member is advanced in said predetermined direction.

28. In mechanism for transporting an elongated tape along a path between a pair of reeling devices which includes a pair of rollers relatively movable towards each other for engaging said tape and driving said tape along said path at a given speed, the improvement comprising means including a lever pivotal in a predetermined direction for carrying one of said rollers into engagement with the other of said rollers, a linkage having one link disposed to contact said tape for displacing said linkage in response to the tension in said tape, said linkage also having a control link biased for movement in directions transverse to said given direction toward said lever into latching engagement with said lever when said lever is pivoted in said predetermined direction, means for driving one of said reeling devices in a direction to wind said tape thereon for reeling said tape along said path at a speed greater than said given speed when conditioned for operation, a control slide operatively coupled to said reeling device driving means and displaceable in said predetermined direction for conditioning said reeling device driving means for operation, a stop slide movable in said predetermined direction, another link coupled to said control link and pivotally mounted for movement in said transverse directions, means projecting from said stop slide and said other link and engageable with each other for pivoting said other link in one of said transverse directions away from said lever to release said control link from latching engagement with said lever when said stop slide is moved in said predetermined direction, and means on said control slide and on said stop slide engageable with each other when said control slide is displaced in said predetermined direction to advance said stop slide in said predetermined direction.

29. Apparatus for handling elongated tape records comprising means for driving said tape in opposite directions along a path between a pair of reeling devices, control means for reversing the direction of tape travel, said control means including a pair of switches, means alternatively coupling said switches to said tape along different portions of said path of travel and responsive to the tension in said tape along said different portions, electrically operated means for conditioning said tape driving means for operation, and switch means controlled by said electrically operated means for establishing a plurality of different energizing circuits to said electrically operated means through different ones of said pair of switches in timed sequence for conditioning said tape driving means for driving said tape in an opposite direction along said path.

30. Apparatus for handling an elongated tape record comprising drive means for driving a tape record in opposite directions along a path, control means for reversing the direction of tape travel comprising a shaft operatively coupled to said tape drive means, a motor for turning said shaft, a solenoid operatively coupled to said tape drive means for conditioning said tape drive means for operation, a plurality of rotatable switches mounted on said shaft, switch means controlled by said tape record for energizing said motor, and a plurality of connections between said rotatable switches, said motor and said solenoid for energizing said solenoid and deenergizing said motor in timed relationship to effect reversal of said tape drive after operation of said switch means.

31. Control apparatus for a magnetic tape recorder including at least one capstan and pressure roller for engaging the tape therebetween for driving said tape in opposite directions between a pair of reeling devices, an electromagnet operatively coupled to one of said pressure roller and capstan for moving said pressure roller and capstan with respect to each other into driving relationship with said tape, a motor for driving said capstan, another motor, a plurality of switches, means coupled to said other motor for closing certain said switches in a timed sequence for establishing an energizing circuit for said electromagnet, and connections between other of said switches and said other motor for energizing said other motor when said tape is exhausted on one of said reels.

32. Apparatus for controlling a mechanism for handling elongated tape records including first means for driving a tape record in one direction along a path and second means for driving said tape record in the opposite direction along said path comprising a shaft, electrically operated means for rotating said shaft, mechanism for selecting a one of said first and second tape drive means coupled to said shaft, electrically operated means for conditioning said selected tape drive means for operation, and means on said shaft for completing circuits for energizing said last named means and deenergizing said motor rotating means in timed sequence.

33. Apparatus for controlling a mechanism for handling elongated tape records including different means for driving said record in opposite directions along the path, switch means operatively coupled to said record at opposite ends of said path for actuation in response to increased tension in said tape at said opposite portions of said path, electrically operated means coupled to said different drive means for conditioning said drive means for operation when energized, a shaft, means coupled to said shaft for selecting different ones of said drive means for operation, a motor for turning said shaft, switch means sequentially operated by said shaft, and circuits established through said switches and said switch means in sequence timed by rotation of said shaft for energizing said motor and said electrically operated means.

34. Apparatus for controlling a mechanism for handling elongated tape records including different tape drive means for driving said record in opposite directions along a path, a shaft, a cam carried by said shaft, mechanism for selecting one of said different driving means operated by said cam, a motor for turning said shaft, and means on said shaft for completing circuits for energizing said motor.

35. The invention as set forth in claim 34 including a solenoid coupled to said drive means for conditioning said drive means for operation when energized, and other means on said shaft for completing another circuit for energizing said solenoid a predetermined time after energization of said motor.

36. Apparatus for controlling a tape transport mechanism including first means for driving a tape record in one direction along a path between a pair of reeling devices and second means for driving said tape record in the opposite direction along said path comprising a first switch, means coupling said first switch to said tape along the portion of said path between said first driving means and one said reeling device for actuating said first switch in response to increased tension in said tape, a second switch, means coupling said second switch to said tape along the portion of said path along said second driving and the other of said reeling devices for actuation in response to an increase in tension in said tape, a solenoid having an armature, said armature being coupled to said driving means for conditioning said driving means for operation when said solenoid is energized to pull in, a shaft, a step motor for driving said shaft, three rotatable switches mounted on said shaft for rotation therewith, a cam mounted on said shaft, mechanism coupling said shaft to said driving means for selecting one of said driving means for operation when said solenoid pulls in, and a plurality of different circuits established through said rotatable switches and said switches coupled for actuation in response to said tension in said tape for energizing said motor and said solenoid timed sequence after actuation of one of said first and said second switches.

37. Apparatus for handling a tape record which comprises means for driving said tape movable into and out of tape driving relationship with said tape and normally disposed out of tape driving relationship, and means engageable with said driving means for retaining said driving means in tape driving relationship only when the tension in said tape does not exceed a predetermined amount.

38. Apparatus for handling a tape record which comprises tape driving means actuable into and out of tape driving relationship with the tape, and means engageable with said driving means responsive to the tension in said tape for holding said driving means in tape driving relationship and releasing said driving means from tape driving relationship when the tension in said tape exceeds a predetermined amount.

References Cited in the file of this patent

UNITED STATES PATENTS

| | | |
|---|---|---|
| 2,714,512 | Reed | Aug. 2, 1955 |
| 2,778,634 | Gams et al. | Jan. 22, 1957 |
| 2,778,636 | Eash | Jan. 22, 1957 |
| 2,778,637 | Eash | Jan. 22, 1957 |
| 2,785,892 | Pastor | Mar. 19, 1957 |
| 2,792,217 | Weidenhammer et al. | May 14, 1957 |
| 2,815,907 | McCormick | Dec. 10, 1957 |
| 2,845,230 | Rhoades | July 29, 1958 |
| 2,868,471 | Klein | Jan. 13, 1959 |
| 2,877,958 | Moore et al. | Mar. 17, 1959 |
| 2,941,741 | Bilsback | June 21, 1960 |

UNITED STATES PATENT OFFICE
CERTIFICATE OF CORRECTION

Patent No. 3,027,109 March 27, 1962

Dallas R. Andrews et al.

It is hereby certified that error appears in the above numbered patent requiring correction and that the said Letters Patent should read as corrected below.

Column 20, line 31, for "ot" read -- to --; line 39, after "because" insert -- of --; column 21, line 9, for "reproduct" read -- reproduce --; column 25, line 4, after "and" insert -- the --; column 28, line 26, for "moveable" read -- movable --; line 52, for "realtionship" read -- relationship --; column 29, line 60, after "reels" insert a comma; column 31, line 44, for "repsect" read -- respect --.

Signed and sealed this 21st day of May 1963.

(SEAL)
Attest:

ERNEST W. SWIDER
Attesting Officer

DAVID L. LADD
Commissioner of Patents